United States Patent
Hart

(10) Patent No.: US 11,976,600 B2
(45) Date of Patent: May 7, 2024

(54) INTERNAL COMBUSTION ENGINE OPTIMISATION SYSTEM AND METHOD

(71) Applicant: Hartech Computation Limited, Bolton (GB)

(72) Inventor: Barry Hart, Bolton (GB)

(73) Assignee: Hartech Computation Limited, Bolton (GB)

( * ) Notice: Subject to any disclaimer, the term of this patent is extended or adjusted under 35 U.S.C. 154(b) by 0 days.

(21) Appl. No.: 18/020,196

(22) PCT Filed: Aug. 9, 2021

(86) PCT No.: PCT/GB2021/052051
§ 371 (c)(1),
(2) Date: Feb. 7, 2023

(87) PCT Pub. No.: WO2022/029453
PCT Pub. Date: Feb. 10, 2022

(65) Prior Publication Data
US 2023/0296061 A1    Sep. 21, 2023

(30) Foreign Application Priority Data

Aug. 7, 2020  (GB) ........................................ 2012351
Sep. 24, 2020 (GB) ........................................ 2015146

(51) Int. Cl.
*F02D 11/10*    (2006.01)
*F02D 9/02*     (2006.01)
(Continued)

(52) U.S. Cl.
CPC .............. *F02D 11/106* (2013.01); *F02D 9/02* (2013.01); *F02D 41/0002* (2013.01);
(Continued)

(58) Field of Classification Search
CPC ...... F02D 11/106; F02D 9/02; F02D 41/0002; F02D 41/22; F02D 2009/0296; F02D 2200/0404; F02D 2200/602
(Continued)

(56) References Cited

U.S. PATENT DOCUMENTS 4,103,652 A * 8/1978 Garside ................... F02D 11/08
                                                            123/332
4,433,661 A * 2/1984 Härtel et al. ............. F02M 3/07
                                                            123/339.28
(Continued)

FOREIGN PATENT DOCUMENTS

DE            3426791 A1    2/1986
DE      102010056209 A1    6/2012
(Continued)

OTHER PUBLICATIONS

United Kingdom Intellectual Property Office, Search Report, GB Application No. 2012351.9, dated Jan. 27, 2021, 4 pages.
(Continued)

*Primary Examiner* — Hai H Huynh
(74) *Attorney, Agent, or Firm* — Mahamedi IP Law LLP

(57) ABSTRACT

The present invention relates to internal combustion engines. More particularly, the present invention relates to an arrangement whereby internal combustion engines can be operated more efficiently at higher compression pressures. Aspects and/or embodiments seek to provide a method and/or apparatus and/or system for using very high compression ratios in internal combustion engines while preventing damage from pinking or knocking.

20 Claims, 18 Drawing Sheets

(51) Int. Cl.
*F02D 41/00* (2006.01)
*F02D 41/22* (2006.01)

(52) U.S. Cl.
CPC ...... F02D 41/22 (2013.01); *F02D 2009/0296* (2013.01); *F02D 2200/0404* (2013.01); *F02D 2200/602* (2013.01)

(58) Field of Classification Search
USPC .............. 123/399, 435; 701/103, 107, 111; 73/114.36, 114.37
See application file for complete search history.

(56) References Cited

U.S. PATENT DOCUMENTS

| | | | |
|---|---|---|---|
| 5,907,971 A * | 6/1999 | Sato | F02D 9/1065 74/25 |
| 6,681,742 B1 | 1/2004 | Hirayama et al. | |
| 7,427,057 B1 * | 9/2008 | Kampman | F02D 9/1065 261/65 |
| 9,002,619 B2 * | 4/2015 | Ito | F02D 41/0002 123/361 |
| 10,012,167 B2 * | 7/2018 | Hiramoto | F02D 41/021 |
| 11,053,880 B1 * | 7/2021 | Yamada | F02D 41/2441 |

FOREIGN PATENT DOCUMENTS

| | | | | |
|---|---|---|---|---|
| DE | 102011076171 A1 | 11/2012 | | |
| JP | S611835 A | 1/1986 | | |
| JP | H0354341 A | 3/1991 | | |
| JP | 2963492 | * 10/1999 | | F02D 9/02 |
| JP | 3404254 | * 5/2003 | | F02D 9/10 |
| JP | 2006063945 A | 3/2006 | | |

OTHER PUBLICATIONS

European Patent Office, PCT International Search Report and Written Opinion, Application No. PCT/GB2021/052051, dated Nov. 15, 2021, 14 pages.

* cited by examiner

INTERNAL COMBUSTION ENGINE OPTIMISATION SYSTEM AND METHOD

FIELD

The present invention relates to internal combustion engines. More particularly, the present invention relates to an arrangement whereby internal combustion engines can be operated more efficiently at higher compression pressures.

BACKGROUND

A vast majority of automobile vehicles are powered by internal combustion engines, such as petrol engines. An internal combustion engine in an automobile will include at least one cylinder and at least one piston working to create reciprocating motion, and a crankshaft. Other components of the engine convert the reciprocating motion of the piston in the cylinder to rotary motion of the crankshaft.

All petrol engines compress air and fuel, then ignite it so that it burns. In a four stroke engine, for example as illustrated in FIG. 1, there is provided an engine with one or more paired piston and cylinder where the piston is operable to move in and out of the cylinder where there are four steps in the combustion cycle: (1) the intake stroke 110, where the piston moves out of the cylinder and causes a pressure drop in the cylinder thus causing air and fuel 114 to be drawn into the cylinder via an intake 112; (2) the compression stroke 120, where the piston moves into the cylinder and compresses the air and fuel 122 in the cylinder; (3) the power stroke 130, where the compressed fuel and air is ignited 134 by the spark plug 132 and the piston moves out of the cylinder; and (4) the exhaust stroke 140, where the piston moves into the cylinder and causes the exhaust gases 142 to be expelled from the cylinder. As the piston inside the petrol engine moves out of the cylinder during the power stroke 130, the pressure inside the cylinder initially rises due to the fuel and air mixture igniting and creating exhaust gases, then the pressure stabilises and then falls (as the piston moves out of the cylinder and increases the space for the igniting fuel and air mixture to expand into within the cylinder) while the piston movement resulting from the ignition turns the crankshaft and causes the output of power from the engine to the vehicle.

The compression ratio, specifically, the geometric compression ratio, is the ratio between the largest volume of the cylinder (with the piston having moved out of the cylinder to its fullest extent in normal operation) and the smallest volume of the cylinder (with the piston having moved into the cylinder to its fullest extent in normal operation), or more technically total swept volume of the cylinder with the piston at bottom dead centre (BDC) divided by the total compressed volume with the piston at the top dead centre (TDC).

The pressure that the fuel and air mixture reaches, specifically the upper cylinder compression pressure when the spark from the spark plug ignites it during the power stroke, is a function of the amount of air trapped at the start of the compression stroke, the compression ratio and the point of ignition in degrees before top dead centre (TDC). So, for example, at the extremes this means more air trapped at a higher compression ratio results in the highest pressure whereas very little air trapped at a lower compression ratio results in the lowest pressure and conversely, more air trapped at a lower compression ratio might equal or be similar to less air trapped at a higher compression ratio.

It is known that fuel burns more efficiently, creates more power and creates less CO2 and fewer emissions as the upper cylinder compression pressure of the fuel and air mixture increases. The upper cylinder compression pressure is a function of the amount of air trapped (often described as the volumetric efficiency) and the geometric compression ratio. However, if the upper cylinder compression pressure of the fuel and air mixture reaches too high a pressure, the flame front burning through the mixture when ignited by the spark plug can cause portions of the fuel and air mixture to explode instantaneously instead of burning in a controlled fashion. These instantaneous explosions are termed "detonation", "knocking" or "pinking".

Other factors can cause the fuel and air mixture to ignite prematurely but which are not "knocking" or "pinking". For example, as when pressure increases in the fuel and air mixture temperature also increases, if the pressure becomes too high then the temperature of the fuel and air mixture can also cause the fuel and air mixture to ignite without the spark from the spark plug, termed "pre-ignition". Another example occurs when glowing carbon deposits remain present in the cylinder, these can ignite the fuel and air mixture. A further relevant example is the use of bad fuel or a type of fuel for which the engine is not designed, which can also cause pre-ignition.

Thus, engine design among vehicle manufacturers requires the choice of a balanced compression ratio which is (a) a high enough compression ratio to benefit from the fuel efficiency, increased power and fewer emission of a high compression ratio and (b) not too high a compression ratio to avoid pre-ignition, knocking or pinking. Typically, vehicle manufacturers choose geometric compression ratios that will not certainly cause knocking or pinking (based on modelling and testing) but are built close to the limit at which knocking or pinking would occur to optimise the benefits of having a high compression ratio (efficient fuel ignition, more power, fewer emissions) but without the risks (their testing or modelling indicates that knocking or pinking will not occur in the performance envelope of the vehicle)

To avoid damage to the engine from knocking or pinking, for example when using bad or the wrong fuel in the engine, engine designs now typically include knock sensors that detect if the engine starts to knock as a safety feature. The control of engine systems that incorporate these sensors, once knocking or pinking is detected in engines, is designed to change the configuration of the engine for a predetermined period of time (for 15 minutes, for example) to prevent further knocking or pinking, for example by changing the configuration in any of a number of ways including but not limited to: spreading the power bands of the engine; changing the ignition timing, changing the camshaft timing and lift, changing the fuel mixture; measuring the air density; measuring the oil and coolant temperatures; and changing the inlet tuning variables with vacuum, fuel and ignition timing maps. Detecting knock when it occurs and making adjustments to prevent knock are important because the engines are designed so close to the limit of detonation due to pinking or knocking and the likelihood of lasting damage to the engine should knocking or pinking occur and persist.

More recently, designs have been proposed for engines that can vary the geometric compression ratio to allow more efficiency, increased power and fewer emissions by physically increasing or decreasing the compression ratio of the engine dynamically in response to the required performance. These engines avoid knock or pinking while allowing optimisation of the compression ratio of the engine by physically adjusting the configuration of the engine (for example by changing the position of the piston relative to the cylinder head so changing the clearance volume and compression ratio to change the volume of the cylinder, or for example by changing the piston positioning relative to the cylinder to change how far into or out of the cylinder the piston can move). However, such engine designs are significantly more expensive to manufacture and previous attempts to produce a viable commercial design have been abandoned except for the Nissan Infiniti QX50 that has recently gone into production using a complex and more expensive to manufacture method of varying the stroke.

SUMMARY OF INVENTION

Aspects and/or embodiments seek to provide a method and/or apparatus and/or system for using very high compression ratios in internal combustion engines while preventing damage from pinking or knocking.

According to a first aspect, there is provided a method of controlling a throttle for an internal combustion engine, the internal combustion engine operable to compress an ingested fuel air mixture, the method comprising the steps of: receiving a throttle signal, the throttle signal operable to open the throttle to a first position; determining whether opening the throttle to the first position will cause damage to the internal combustion engine, the determination comprising assessing whether the throttle being opened to the first position will cause the ingested fuel air mixture to exceed a predetermined pressure threshold that will cause damage to the internal combustion engine; and modifying the throttle signal to open the throttle to a second position if it is determined that opening the throttle to a first position will cause damage to the internal combustion engine, the second position of the throttle having been determined to open the throttle to a position that will not cause damage to the internal combustion engine.

According to a modified first aspect, there is provided a method of controlling a throttle for an internal combustion engine, the internal combustion engine operable to compress an ingested fuel air mixture, the method comprising the steps of: receiving a throttle signal, the throttle signal operable to open the throttle to a first position; determining whether opening the throttle to the first position will cause damage to the internal combustion engine, the determination comprising assessing whether the throttle being opened to the first position will cause the compression of the ingested fuel air mixture to exceed a predetermined pressure threshold that will cause damage to the internal combustion engine; and modifying the throttle signal to open the throttle to a second position if it is determined that opening the throttle to a first position will cause damage to the internal combustion engine, the second position of the throttle having been determined to open the throttle to a position that will not cause damage to the internal combustion engine.

Alternatively, or in addition, to using map data (i.e. data mapping throttle positions to, for example and without limitation, current & projected torque; BMEP; or similar parameters) the determination (of whether opening the throttle to the first position will cause damage to the internal combustion engine) is made by calculations of any or any combination of: current & projected torque; BM EP; or similar parameters. Further alternatively, a model representing the map data can be used to determine whether opening the throttle to the first position will cause pinking, knocking or damage to the internal combustion engine.

Determining whether a throttle signal will cause a throttle to open such that damage will be caused to an internal combustion engine can allow for a throttle to be opened, for example by modifying the throttle signal, only to an extent that it is certain won't cause damage to an engine having a very high compression ratio, for example to replace the throttle signal with a replacement throttle signal that is limited to allowing/causing the maximum (pre-) determined throttle opening that won't cause damage to the internal combustion engine and/or a replacement throttle signal that spreads out the throttle demand while only allowing/causing the maximum (pre-)determined throttle opening that won't cause damage to the internal combustion engine.

Optionally, the step of determining whether opening the throttle to the first position will cause damage to the internal combustion engine comprises using predetermined map data.

Using a pre-determined map can allow straightforward determinations of whether a performance demand is "safe" or "unsafe" based on predetermined test data or calculations.

Optionally, the step of determining whether opening the throttle to the first position will cause damage to the internal combustion engine comprises using one or more calculations for the internal combustion engine, optionally wherein the one or more calculations are predetermined.

Using one or more calculations, formulae or thresholds (alone or in combination) can allow a determination to be made using the performance demand and the current parameters/sensor data for the engine.

Optionally, the throttle signal is received from a throttle control. Optionally, the throttle control is an accelerator pedal.

In some embodiments, a throttle control can provide the throttle signal. In certain embodiments, the throttle control can include an accelerator pedal but in other embodiments other controls can be used such as cruise control, speed control, temperature controls, traction control, stability control and/or anti-lock braking.

Optionally, there is provided a second throttle wherein the throttle is operable to be opened to a first or second position to restrict the airflow to the second throttle. Optionally the throttle and second throttle are configured/provided in series.

In some aspects and/or embodiments, a second throttle can be provided to work in conjunction with existing throttles to allow the use of very high compression ratios in the engine.

Optionally, there is provided one or more sensors wherein the one or more sensors provide data on the internal combustion engine and wherein the data is used to make the determination in the step of determining whether opening the throttle to the first position will cause damage to the internal combustion engine, the determination using map data for the internal combustion engine to assess whether the throttle being opened to the first position will cause the ingested fuel air mixture to exceed a predetermined pressure threshold that will cause damage to the internal combustion engine.

Alternatively, or in addition, to using map data the determination (of whether opening the throttle to the first position will cause damage to the internal combustion engine) is made by calculations of any or any combination of: current & projected torque; BMEP; or similar parameters.

Using one or more sensors can allow a determination to be made about whether an engine having a very high compression ratio might be liable to pinking or knocking for a given performance demand/setting.

Optionally, modifying the throttle signal comprises generating a second throttle signal and controlling a further throttle using the second throttle signal.

Providing a second throttle and determining a signal to control the second throttle in conjunction with the first throttle can allow an engine to be remanufactured with a very high compression ratio but allow knocking or pinking to be prevented by controlling the throttle using a second throttle in conjunction with the original throttle.

According to another aspect there is provided a controller operable to modify a throttle signal for an internal combustion engine, the controller operable to modify the throttle signal using the method of any other aspect. Optionally, the controller comprises an engine control unit.

Providing a controller that can be used with a very high compression ratio engine can allow the controller to be used to prevent knocking or pinking.

According to a further aspect there is provided a throttle assembly comprising a throttle and a stop, the stop operable to restrict a maximum opening position of the throttle to a predetermined opening position wherein the predetermined opening position is less than the maximum opening position.

Providing a stop can allow only a maximum safe permitted throttle opening, thus preventing pinking or knocking in an engine.

Optionally, the stop is switchable between at least two settings such that at one setting the maximum opening position of the throttle is restricted to the predetermined opening position and in another setting the maximum opening position of the throttle is unrestricted.

Providing a stop that can be switched between preventing a maximum opening of a throttle and a limited opening of a throttle can permit different modes of operation having different ecological footprints for the same engine. Optionally, the stop positions can be adjustable between multiple positions, allowing it to be switched between "urban", "motorway" and a "full performance" settings for example, each setting achieving different levels of reduction in throttle opening and therefore performance characteristics of the vehicle.

Optionally, the stop is switchable based on any or any combination of: a switch; and an accelerator pedal position.

Providing a switch that is operated manually or using an accelerator pedal can allow use in normal driving conditions without significant effort on the part of a user.

Optionally, stop is a physical stop. Optionally, the physical stop is any or any combination of: a moveable cam; a motorised cam.

Providing a physical stop can allow installation in a larger variety of situations. Providing a stop that can be moved allows for the position of the stop to be adjusted manually or dynamically.

Optionally, the stop is an electronic stop. Optionally, the stop limits the signal to the controller from the pedal to a setting that will be safe.

Providing a stop that is electronic can allow for adjustment and can minimise or avoid the need to install a physical component to restrict throttle opening.

According to a further aspect there is provided a system comprising an internal combustion engine, a throttle and a controller, the controller operable to control the throttle and the throttle in communication with the internal combustion engine, and the internal combustion engine operable to compress an ingested fuel air mixture, the controller operable to: receive a throttle signal, the throttle signal operable to open the throttle to a first position; determine whether opening the throttle to the first position will cause damage to the internal combustion engine, the determination comprising assessing whether the throttle being opened to the first position will cause the ingested fuel air mixture to exceed a predetermined pressure threshold that will cause damage to the internal combustion engine; and modify the throttle signal to open the throttle to a second position if it is determined that opening the throttle to a first position will cause damage to the internal combustion engine, the second position of the throttle having been determined to open the throttle to a position that will not cause damage to the internal combustion engine.

Optionally, the internal combustion engine comprises a geometric compression ratio operable to cause damage to the internal combustion engine if the internal combustion engine is permitted to compress the ingested fuel air mixture above the predetermined pressure threshold.

Optionally, the step of modifying the throttle signal is performed over a time period, optionally wherein the time period is determined by determining the time required for the modified throttle signal to cause performance of the internal combustion engine to reach the performance level indicated by the throttle signal.

BRIEF DESCRIPTION OF DRAWINGS

Embodiments will now be described, by way of example only and with reference to the accompanying drawings having like-reference numerals, in which.

SPECIFIC DESCRIPTION

Figure 1:
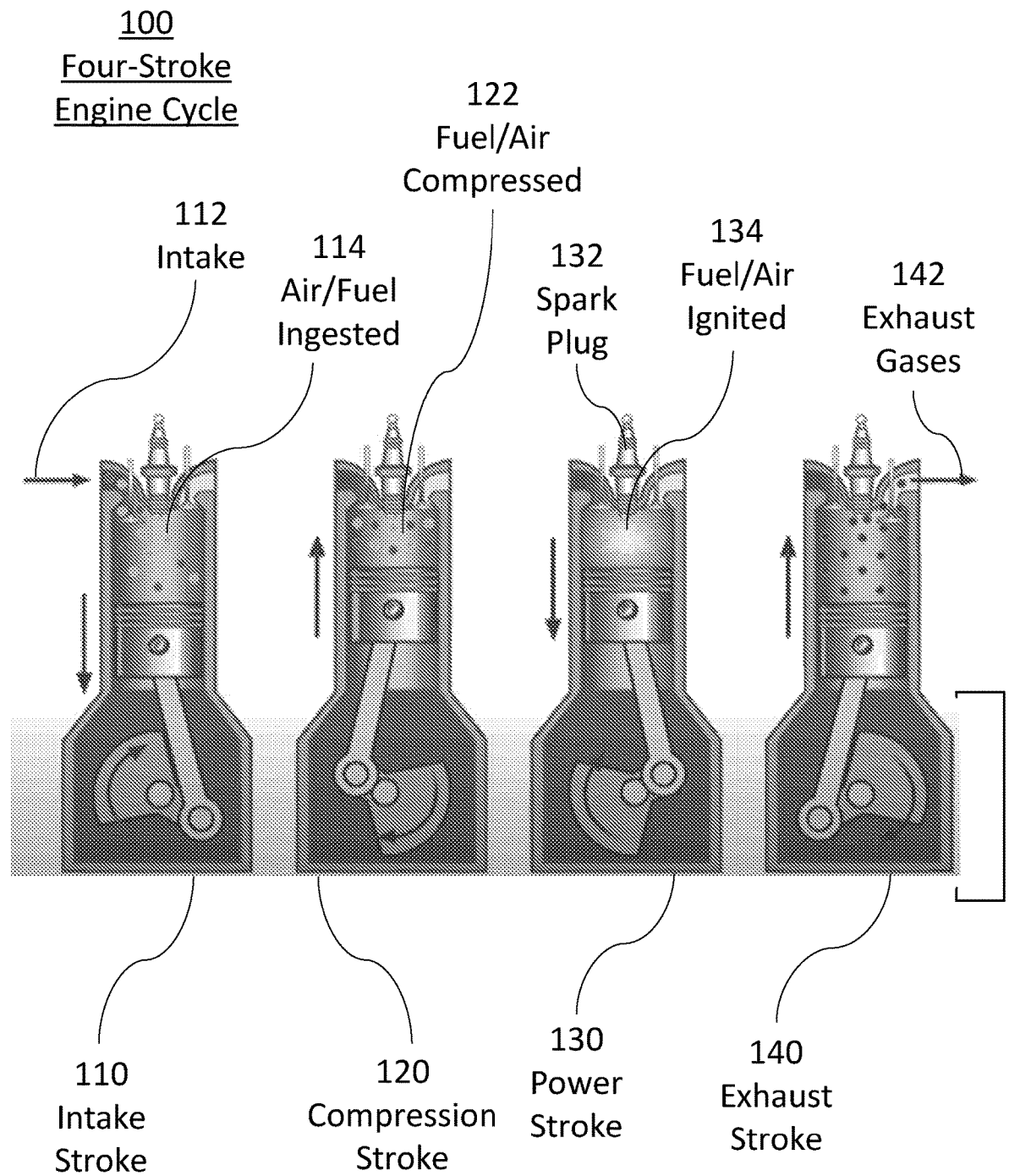
FIG. 1 shows the stages of operation of a cylinder and piston in a four-stroke internal combustion engine running on petrol as a fuel.

Referring to FIGS. 2 to 18, various example embodiments will now be described in more detail below.

Engines for vehicles are designed with a focus on peak operation properties of the engine, specifically so that the highest compression of the air and fuel mix in the cylinder is achieved when the maximum amount of air is ingested by the engine and when the engine running with the throttle fully open (or nearly fully open) as this allows the maximum air to be inducted (or maximum volumetric efficiency) and at the number of revolutions of the crankshaft it was designed to operate at most efficiently with a high load for the engine to pull against (i.e. the vehicle travelling uphill, or carrying a heavy cargo, or in a high gear).

These peak conditions mean that the maximum amount of air being ingested with the throttle fully (or nearly fully) open provides good volumetric efficiency, such that the engine running over the range of revolutions at which it was designed to operate most efficiently provides the maximum torque over this range of revolutions.

Pinking or knocking typically only occurs when such engines are operating at or near these peak conditions, usually due to a factor not anticipated in the design of the engine such as an incorrect fuel or fuel mixture being used, contaminants or faults.

However, in contrast to the peak conditions that serve as the focus of the engine design, typically engines for vehicles operate for most of their lifetime running hours and mileage at extremely low power and crankshaft revolutions, at compression ratios of around 2:1 (with the resulting poor efficiency, power, fuel consumption and emissions). Thus, with extremely low power being produced and there being very low pressures in the upper cylinders, the resulting typical compression pressures are too low to induce knock even with such a high compression ratio that would produce knock at revs and high throttle openings for high end power and torque. As a result, engines typically run within an operating envelope that is inefficient, uneconomical and produce more emissions compared to operating at the peak conditions for which it was designed. Thus, in real world use of engines, the compression ratios chosen during the design phase of engines are not relevant in most of the lifetime of an engine because at typical road use speeds (for example at 40 mph) the power produced by the engine to sustain these speeds is a fraction of the potential power available, because the compression pressures are much lower than at peak power as this is all the power that is required to sustain a speed (of, for example, 40 mph). Furthermore, the maximum power of the engine influences the cylinder pressures it runs with at low speeds, so a small engine running at 40 mph will need to run with high throttle openings closer to maximum power and therefore with a high compression pressure (and good efficiency) but a larger capacity sports car engine also running at 40 mph will be at such a small throttle opening and require such a small cylinder pressure that it will be running at a much lower efficiency. As a result, use in typical conditions means that a significantly high geometric compression ratio can be used safely.

As most of the lifetime running hours and mileage of most engines are spent operating at extremely low power relative to peak available performance, there follows a low likelihood of pinking or knocking occurring such that in most use conditions a higher geometric compression ratio could be used safely with all its associated benefits.

If knocking or pinking occurs too often or at a significant level above the design threshold of the internal combustion engine, then permanent damage to the internal combustion engine can result.

Thus knocking and pinking problems associated with high compression ratio engines are limited to a small range of driving conditions in a typical vehicle at or near peak performance of its internal combustion engine, but the design of those engines is still limited as to how high the compression ratio can be due to the damage that might be caused to the engine in this small range of driving conditions if the compression ratio is too high and repeated or severe knocking or pinking occurs.

Instead of using knock sensors to detect knocking or pinking after it occurs in order to take mitigating actions, aspects and/or embodiments propose to prevent knocking or pinking occurring.

Figure 2:
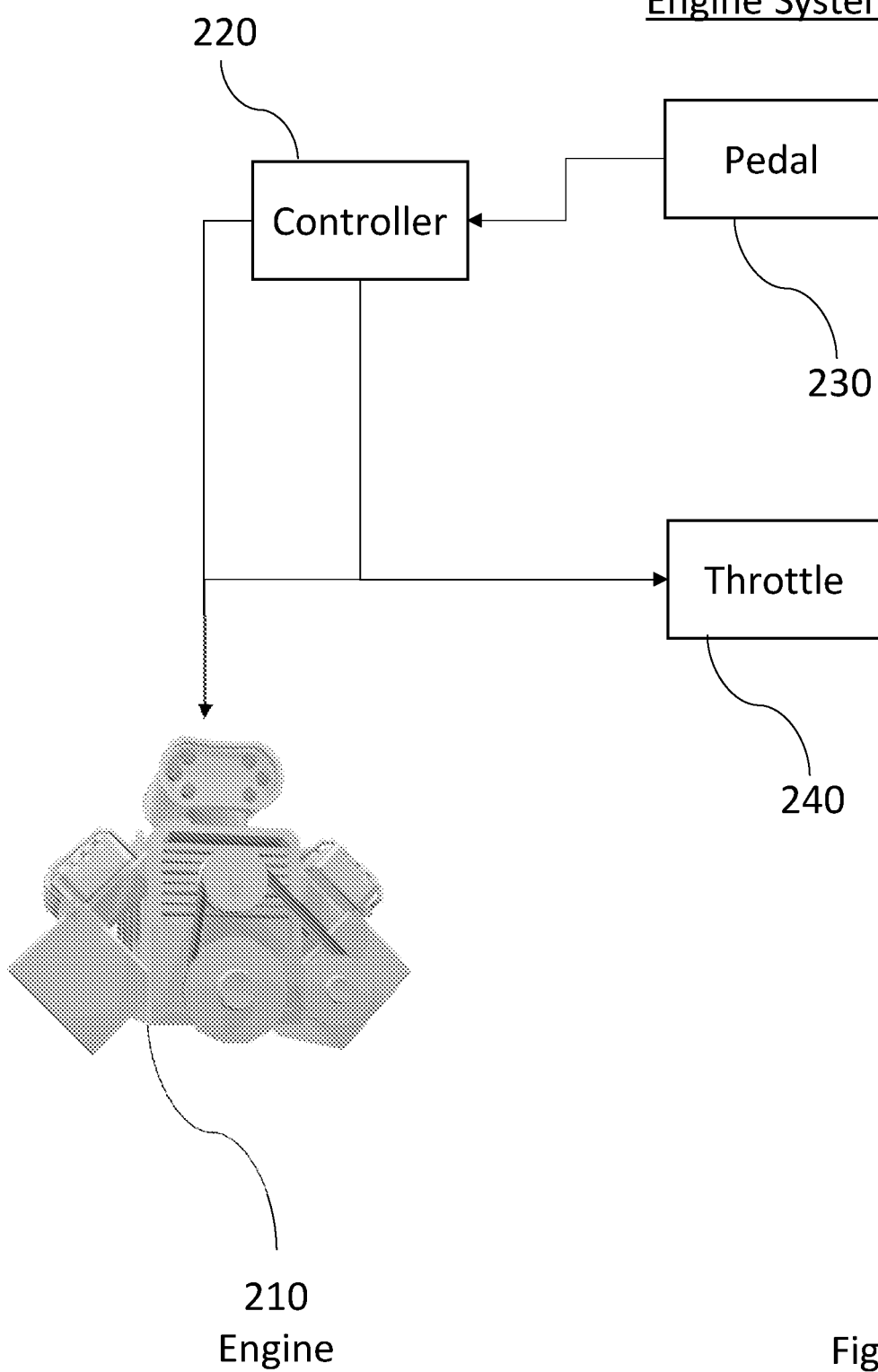
FIG. 2 shows a simplified overview of the system of an example embodiment.

Referring to FIG. 2, an example embodiment 200 will now be described in more detail.

The example embodiment 200 provides a petrol engine 210 to which there is connected a controller 220. The pedal 230, which is operated by the driver of the vehicle, is connected to the controller 220. The throttle 240 is connected to both the controller 220 and the engine 210. In alternative embodiments, other throttle controls may be used instead, or in addition to, a pedal such as cruise control systems for example.

In the example embodiment, the petrol engine 210 is designed to have a very high compression pressure (compared to current designs) at a more typical performance envelope—i.e. having a high compression ratio (specifically a high geometric pressure ratio) of for example 13:1 to 15:1 (or higher). This will result in the cylinders of the engine 210 operating above a pressure that will certainly cause knocking on full (or close to full) throttle openings of the throttle 240 and in the maximum torque range of revolutions thus at a pressure that causes knocking or pinking, but allows the engine 210 to operate more efficiently at lower, more typical, speeds when the throttle 240 is naturally more closed and the resulting lower cylinder pressures will not cause knocking despite the high geometric compression ratio. The design of the engine 210 is such that using the high compression ratio used in the design will mean a certainty of knocking or pinking at full (or nearly full) throttle openings of the throttle 240 and in the maximum torque range and therefore the engine 210 will not run "safely" due to the very high likelihood of damage from the knocking or pinking if normal use of the throttle 240 was permitted.

To prevent knocking or pinking (as opposed to detecting knocking/pinking when it has occurred as per the prior art knock sensors and making adjustments following this detection), the signal from the pedal 230 to the throttle 240 is intercepted by a controller 220 and if needed, the signal to the throttle 240 is modified. Specifically, the performance demand of the driver as indicated by the signal from the pedal 230 is compared to stored maps/statistics (or calculated from formulae and data acquisition predicting the outcome of the drivers throttle demand position, engine revolutions, gear choice, ambient conditions, etc) and it is determined whether the performance demand will cause imminent knocking—if it is determined that imminent knocking will occur by allowing the performance demand then the signal to the throttle 240 is modified to adjust the performance demand to one that provides safe conditions or settings by reducing the opening of the throttle 240 (or spreading the throttle opening demand over time) to allow the intake air flow at a level that it is determined from the maps/statistics will not cause knocking or pinking. Where it is determined that the performance demand will not cause imminent knocking then the signal from the pedal 230 is not modified and the throttle 240 is opened as per the signal from the pedal 230. The maps/statistics of this embodiment indicate running conditions which are "safe" and "unsafe" and can be used to predict imminent knock based on inputs such as performance demands indicated by signals from the pedal 230.

The pedal 230 in this arrangement is used to vary the compression pressure in the engine 210, but to prevent damage to the engine 210 the signal from the pedal 230 to the throttle 240 needs to be modified if (or when) it would cause pinking or knocking. To do this, the throttle signal is restricted if the controller 220 receives a signal from the pedal 230 that would open the throttle 240 sufficiently that the pressure in the engine 210 would otherwise rise to a level at which pinking or knocking occurs. To restrict the signal, the controller 220 replaces the signal that would cause the throttle 240 to open an amount that would cause too much air to be ingested by the engine 210 with a signal that allows the engine 210 to operate at its maximum safe opening of the throttle 240 for the high compression ratio of the engine 210. This modification of the throttle signal to limit how far the throttle 240 opens prevents the engine 210 being damaged by knocking or pinking.

The controller 220 is an electronic control unit provided with stored maps (and/or mathematical formulae) and the controller 220 compares the signal to the maps (or calculates the projected outcomes) to assess whether the pedal to throttle signal will cause knocking or pinking. Electronic throttles 240 are operated by the engine control unit and by intercepting the signal from the pedal 230, the controller 220 can then pass the modified throttle signal to the throttle 240 via the engine control unit or directly, depending on the embodiment.

The stored maps can be generated by measuring and determining the conditions of the engine 210 that cause knocking or pinking, such as measuring the brake-horsepower, torque, the brake mean effective pressure (BMEP) at different revolutions per minute of the crankshaft, the gear selected and the load on the engine. Taking these measurements in different gears and under different loads using measuring devices under different recorded throttle settings and comparing or calculating the results under different running conditions can establish "safe" and "unsafe" upper cylinder compression pressure conditions (i.e. the conditions that will or will not cause knocking or pinking). Thus, conditions can be determined and stored in a data map for use by the controller 220 to use to determine whether to modify the signal from the pedal 230 (i.e. when "unsafe" upper cylinder compression pressure conditions are determined to be imminent based on the performance demand of the unmodified signal from the pedal 230).

The engine 210 can therefore be produced for a similar cost to standard engines (because a higher compression piston costs substantially no more to manufacture and most engines already have electronic pedals and throttles) and with the addition of the controller 220 can be designed with a significantly higher compression pressure ratio and thus benefit from the advantages of using a significantly higher pressure ratio (i.e. the engine can be more fuel efficient, develop higher power and output lower negative or unwanted exhaust emissions) while being prevented from damage from knocking or pinking by the controller 220 intercepting and modifying signals from the pedal 230 that would cause the upper cylinder compression pressure to reach levels that would cause knocking and pinking and therefore be likely to damage the engine 210.

In some embodiments, the controller 220 is able to dynamically modify the signal from the pedal 230 as the controller 220 can be programmed to monitor the running settings of the engine 210 and continuously adjust the modifications to the signal from the pedal 230, for example in the situation where an instantaneous signal from the pedal 230 will not cause any damage but if maintained then pinking or knocking would occur, so before this potential for damage to the engine occurs 210 the throttle signal is modified to prevent any damage to the engine 210 from pinking or knocking.

As the engine 210 is purposely constructed with a high geometric compression ratio, even in normal running conditions it will result in knocking or pinking as, rather than only at peak running conditions, in a higher proportion of running conditions the throttle driving demands (i.e. at some throttle driving demands at specific speeds and in specific gears) will certainly result in knocking or pinking. Without new permanent control features, in this embodiment by the addition and use of the controller 220 in conjunction with the engine 210 and pedal 230, the engine 210 would become damaged. The use of the controller 220 to immediately reduce throttle control or spread throttle demand to reduce airflow when driver demand conditions are predicted to cause imminent pinking or knocking.

In some embodiments, the functions of the controller 220 can be performed by the engine control unit. The signal from the pedal 230 (i.e. the signal generated by the driver pushing the accelerator pedal to a specific position) is received by the engine control unit. The engine control unit understands the position of the pedal 230 from the signal received and assesses if the result of the throttle opening caused by this signal will incur detonation, pinking or knocking using the map data and the engine running data such as revolutions of the crankshaft, gear selected, etc. If the signal from the pedal 230 is determined not to cause these effects and therefore damage the engine 210, then the throttle is opened as per the signal from the pedal 230. If it is determined that the signal from the pedal 230 will cause these effects and damage to the engine 210 then the signal is modified accordingly to open the throttle only as much as possible as will not damage the engine 210, based on the map data, but not as much as if the signal from the pedal 230 wasn't modified.

In other alternative embodiments, the controller 220 can be integrated into the engine control unit.

In still other alternative embodiments, for example where remanufacturing an engine or modifying an existing vehicle, a second throttle or controller can be used in series with the existing throttle/controller. The second throttle is controlled by a separate engine control unit (either which performs the functions of controller 220 or which has a controller 220 or has a controller 220 integrated into the engine control unit). The second throttle is used purely to modify how much air is ingested to pass on to the first original throttle to prevent knock or pinking in the (for example remanufactured) engine. This arrangement may be necessary because many controls are imposed from the main engine control unit onto the existing throttle so using a second throttle in series can be an easier way to implement a limit on how much the throttle opens, especially where the engine has been remanufactured to have a significantly higher compression ratio and thus would suffer from almost constant knock or pinking and become damaged as a result if used with just the existing throttle (as this was designed for use with a much lower compression ratio).

In some embodiments, in addition to what is described in other aspects/embodiments, the engine 210 no longer necessarily needs knock detection sensors or methods to be used, as the controller 220 (or functionality of the controller 220 if integrated into another controller/control method) prevents knocking or pinking occurring. This can reduce total component costs of an engine if no knock detection sensor is incorporated during manufacture or production of a vehicle.

Figure 3:
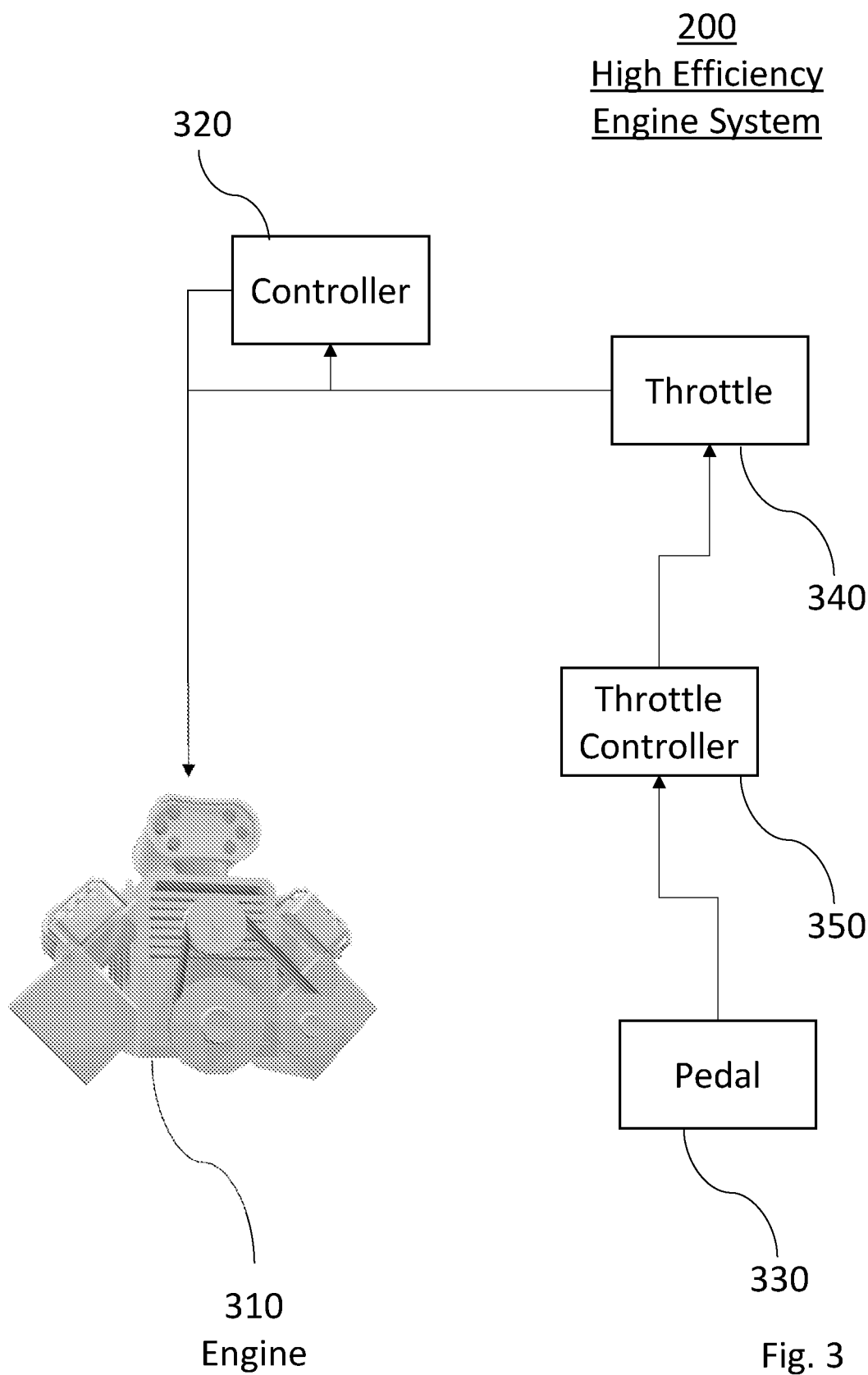
FIG. 3 shows a simplified overview of the system of a further example embodiment.

Referring to FIG. 3, another example embodiment will now be described in further detail.

An engine 310 is connected to a controller 320 and a throttle 340, and in turn the throttle 340 is connected to a throttle controller 350 which in turn is connected to a pedal 330.

The pedal 330 signal is intercepted by the throttle controller 350 which calculates (or compares the pedal demand position to pre-loaded/pre-determined "safe" and "unsafe" maps) whether the signal would result in knocking or pinking in the engine 310 should the throttle 340 be opened to the extent indicated by the signal from the pedal 330. As with the previously described example embodiment of FIG. 2, the same approach to intercepting the signal from the pedal 330 and modifying the signal if necessary to ensure opening the throttle 340 only to the maximum extent that prevents the engine 310 from pinking or knocking.

The above described embodiments can allow engines to be designed to be substantially efficient and/or environmentally beneficial in conditions under which they most often are driven in (e.g. at partial throttle openings), rather than only at peak operating conditions, by applying control signals/a control system that prevents knocking or pinking on the typically rarer occasions when a driver demands higher or full performance. In at least some embodiments, should the driver demand full performance from the high compression ratio engine having the described control system/method applied, the upper cylinder compression pressure will be the same pressure that the engine would have been running at if the engine had a lower compression ratio, so the engine performs with same output as it would having been designed with a lower more common and safe compression ratio but with the added safety of knocking or pinking being prevented by the control system/method.

Figure 4:
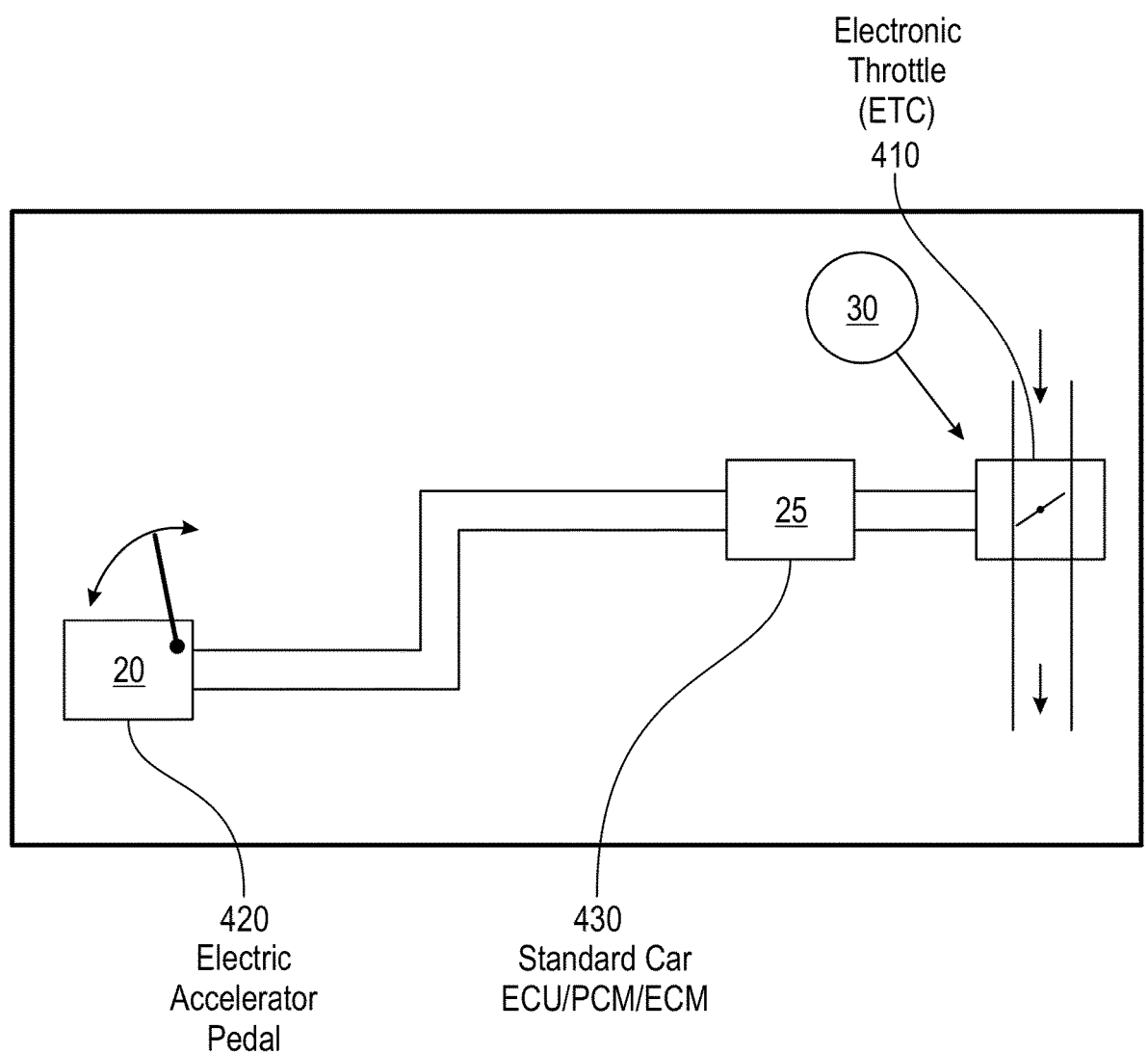
FIG. 4 shows an example embodiment.

In the example embodiment shown in FIG. 4, an electronic accelerator pedal 420 is provided in communication with a standard car electronic control unit (ECU or engine control module "ECM" or powertrain control module "PCM") 430. The ECU 430 is in turn provided in communication with an electronic throttle 410.

The pedal 420 provides a signal to the ECU 430 that indicates a performance demand of the driver of the car. By controlling or adapting the electronic throttle 410 so that, under parameters that would otherwise be certain to cause knock, the ECU 430 alters the throttle setting to the throttle 410 from the setting that the signal from the pedal 420 is demanding to a setting that is anticipated will certainly not cause knocking (before knocking can even occur).

The example embodiment can be used in newly manufactured engines or with remanufactured engines, but where used with remanufactured engines will require changes to the original ECU 430.

Figure 5:
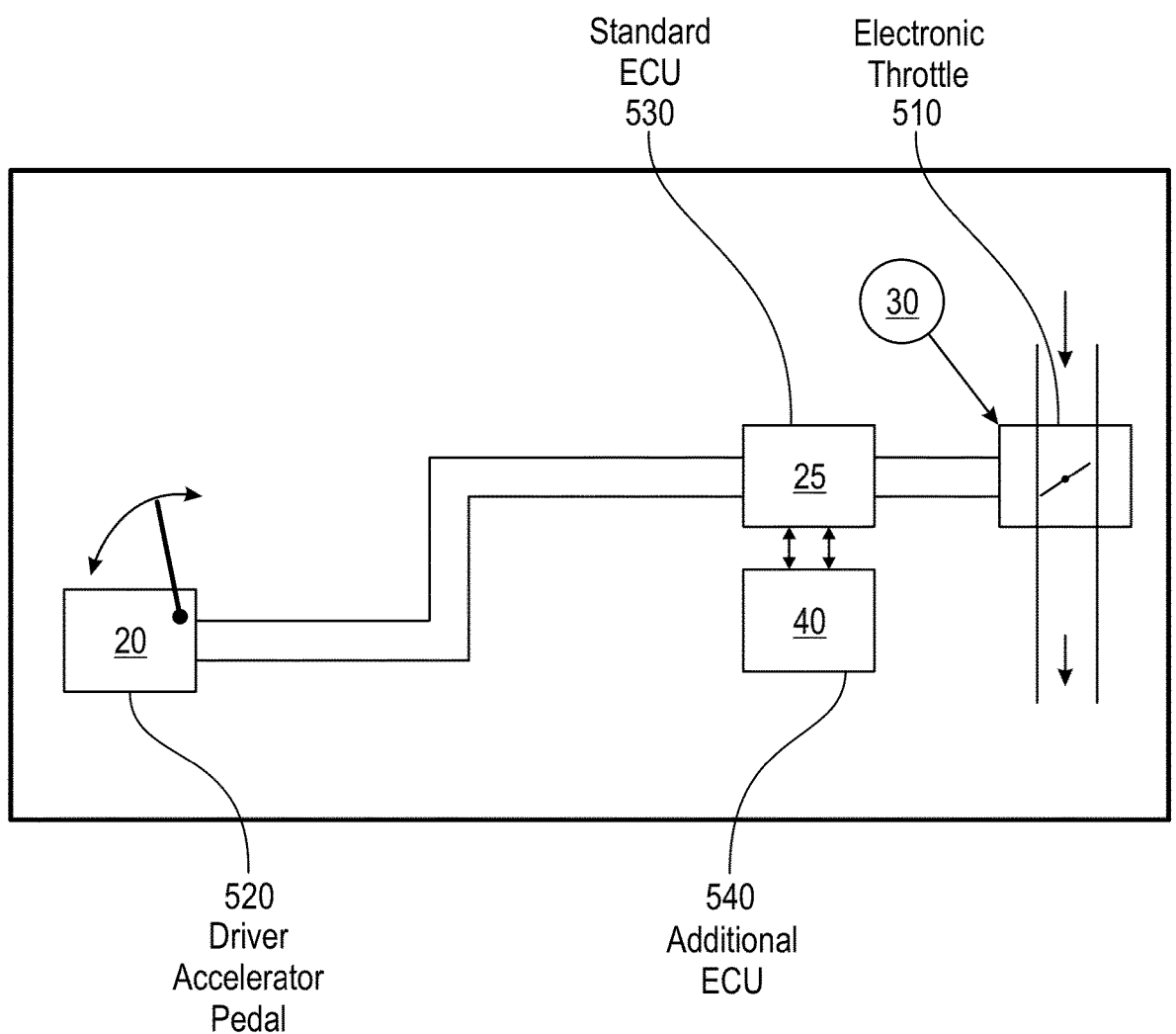
FIG. 5 shows an example embodiment.

In the example embodiment shown in FIG. 5, a driver accelerator pedal 520 is provided in communication with a standard ECU 530. Further, the standard ECU 530 is provided in communication with an additional ECU 540 and with an electric throttle 510.

By controlling or adapting an electric throttle 510 so that, under parameters that would otherwise be certain to cause knock, a combination of the data in the standard ECU 530 and the additional ECU 540 work together to alter the output to the throttle 510 by diverting data into the additional ECU 540 and back to the original ECU 530 to modify the output to the throttle 510 from the setting that the driver accelerator pedal 520 is demanding to a setting in those conditions that is anticipated will certainly not cause knocking (before knocking can occur).

The example embodiment can be used in newly manufactured engines or with remanufactured engines, but where used with remanufactured engines will require changes to the original ECU 530.

Figure 6:
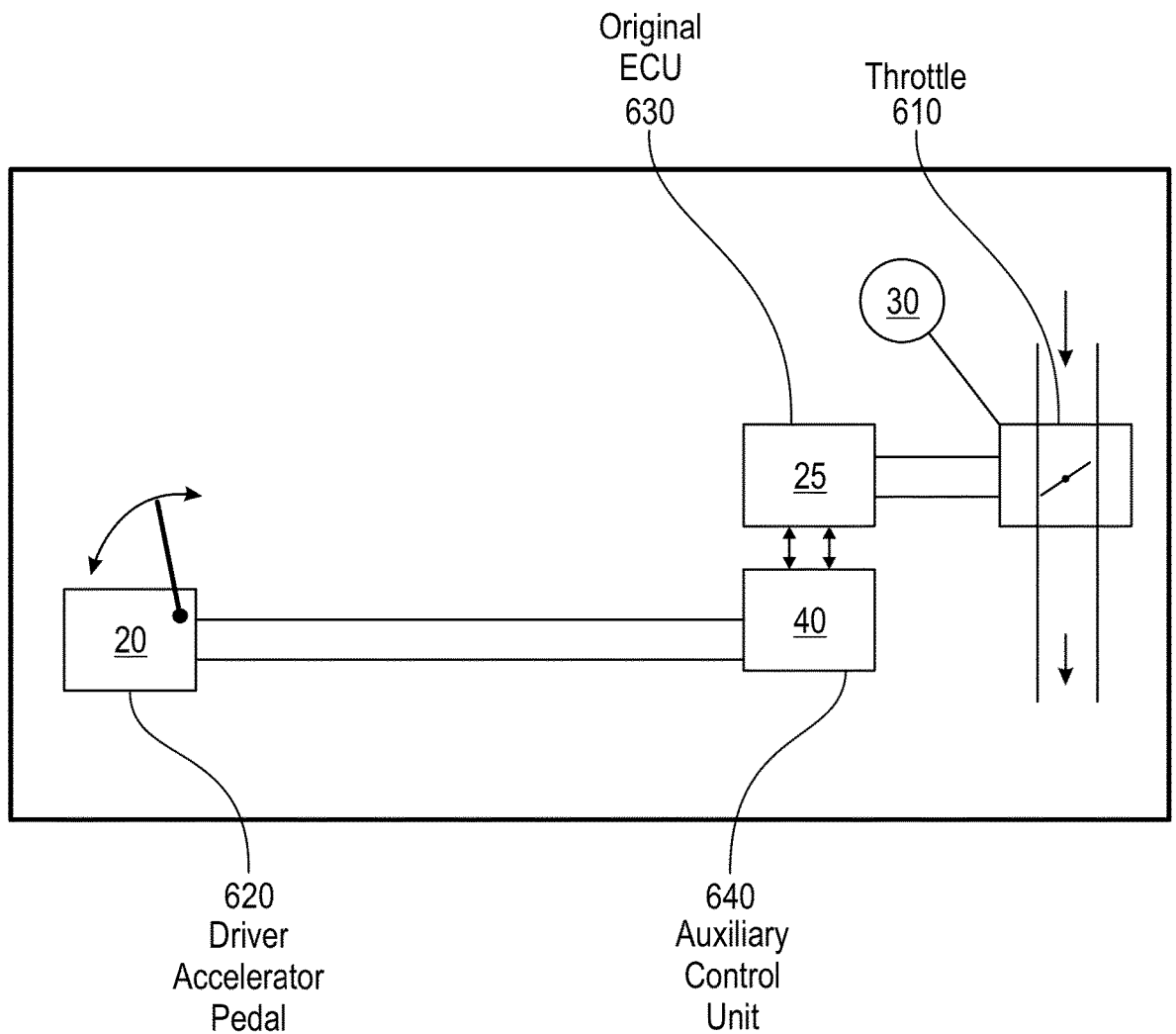
FIG. 6 shows an example embodiment.

In the example embodiment shown in FIG. 6, a driver accelerator pedal is shown in communication with an auxiliary control unit 640. The auxiliary control unit 640 is in communication with the original ECU 630. The original ECU 630 is in communication with the throttle 610.

By controlling or adapting the electric throttle 610 so that, under parameters that would otherwise be certain to cause knock, a combination of (the data in) the standard ECU 630 and the additional control unit 640 work together to alter output to the throttle 610 by diverting it directly into the auxiliary control unit 640 first and on to the original ECU 630 to modify the output to the ECU 630 and therefore the throttle 610 from the setting the driver accelerator pedal 620 is demanding to one that in those conditions is anticipated will certainly not cause knocking (before knocking can occur).

The example embodiment can be used in newly manufactured engines or with remanufactured engines, but where used with remanufactured engines will require changes to the original ECU 630.

Figure 7:
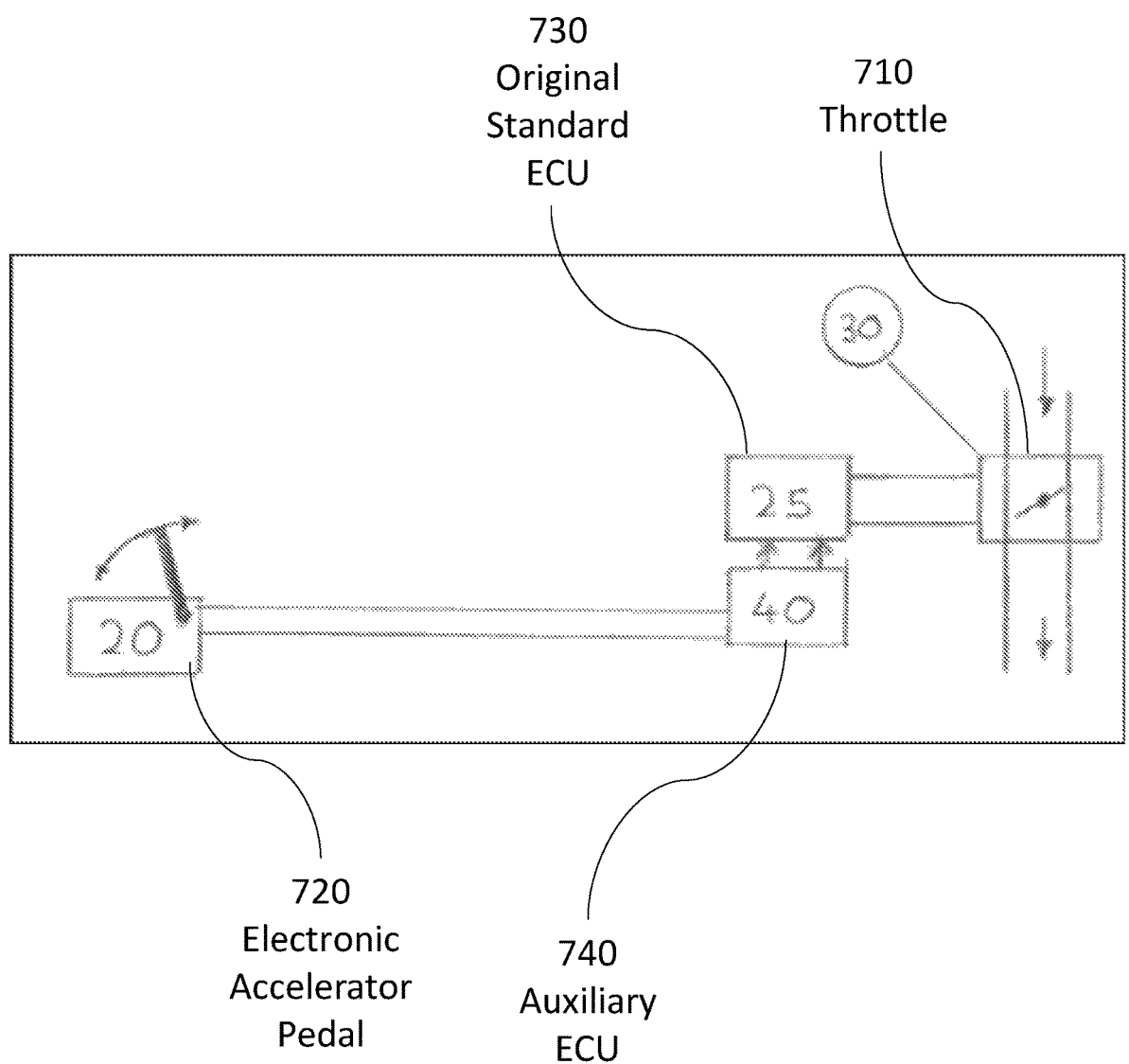
FIG. 7 shows an example embodiment.

In the example embodiment shown in FIG. 7, an electronic accelerator pedal 720 is provided in communication with an auxiliary ECU 740. The auxiliary ECU 740 is provided in communication with an original standard ECU 730 which, in turn, is provided in communication with a throttle 710.

By controlling or adapting the signal from the electronic accelerator pedal 720 using an auxiliary ECU 740 that is independent of the main ECU 730, the auxiliary ECU 740 can compare the safe and unsafe (i.e. won't or will cause knocking or pinking respectively) data and when it detects or anticipates that knock is imminent the auxiliary ECU 740 can alter the signal from the accelerator pedal 720 before passing it through to the standard ECU 730 to a signal that would not cause knock if that had been the true position that the driver had intended to open the throttle to in the first place. Thus, the modified signal "fools" the standard ECU 730 into thinking that the driver had not opened the throttle 710 sufficiently to cause knocking/pinking and the electronic throttle 710 only to the degree that will certainly not cause knocking (before knocking can occur).

The example embodiment can be used in newly manufactured engines or with remanufactured engines, and would not require changes to the original ECU for remanufactured engines (but would require additional components with newly manufactured engines).

Figure 8:
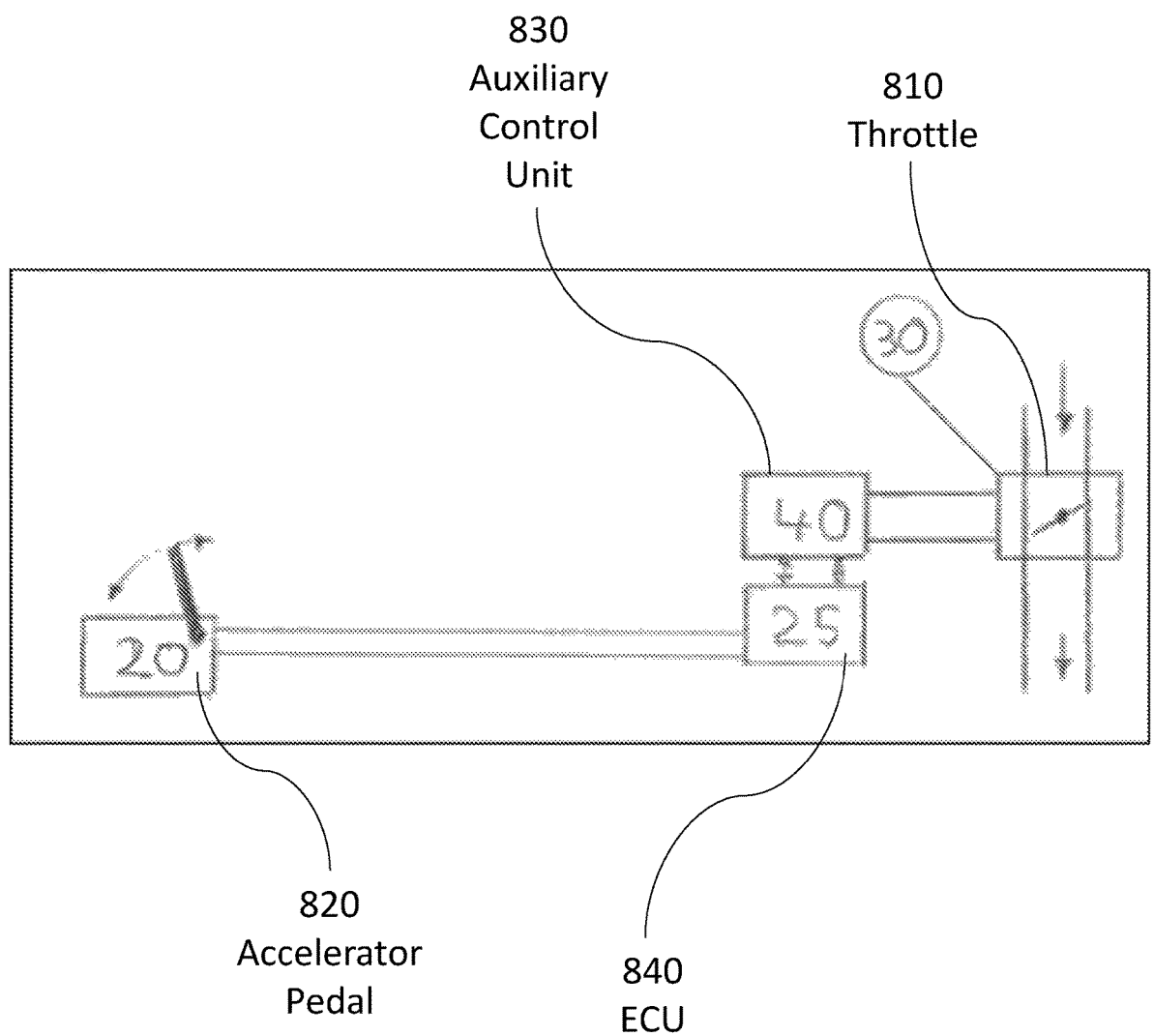
FIG. 8 shows an example embodiment.

In the example embodiment shown in FIG. 8, an accelerator pedal 820 is provided in communication with an ECU 840. The ECU 840 is provided in communication with an auxiliary control unit 830 and the auxiliary control unit 830 is provided in communication with a throttle 810.

By controlling or adapting an electric throttle 810 so that, under parameters that would otherwise be certain to cause knock, the output from the accelerator pedal 820 and ECU 840 (that would normally go directly to the electronic throttle) passes in series into the auxiliary control unit 830 before reaching the throttle 810. In the auxiliary control unit 830, the output of the accelerator pedal 820 and/or ECU 840 is modified from an output that the accelerator pedal 820 is demanding to one that, in those conditions, it is anticipated will certainly not cause knocking (before knocking can occur).

The example embodiment can be used in newly manufactured engines or with remanufactured engines, and would not require changes to the original ECU for remanufactured engines (but would require additional components with newly manufactured engines).

Figure 9:
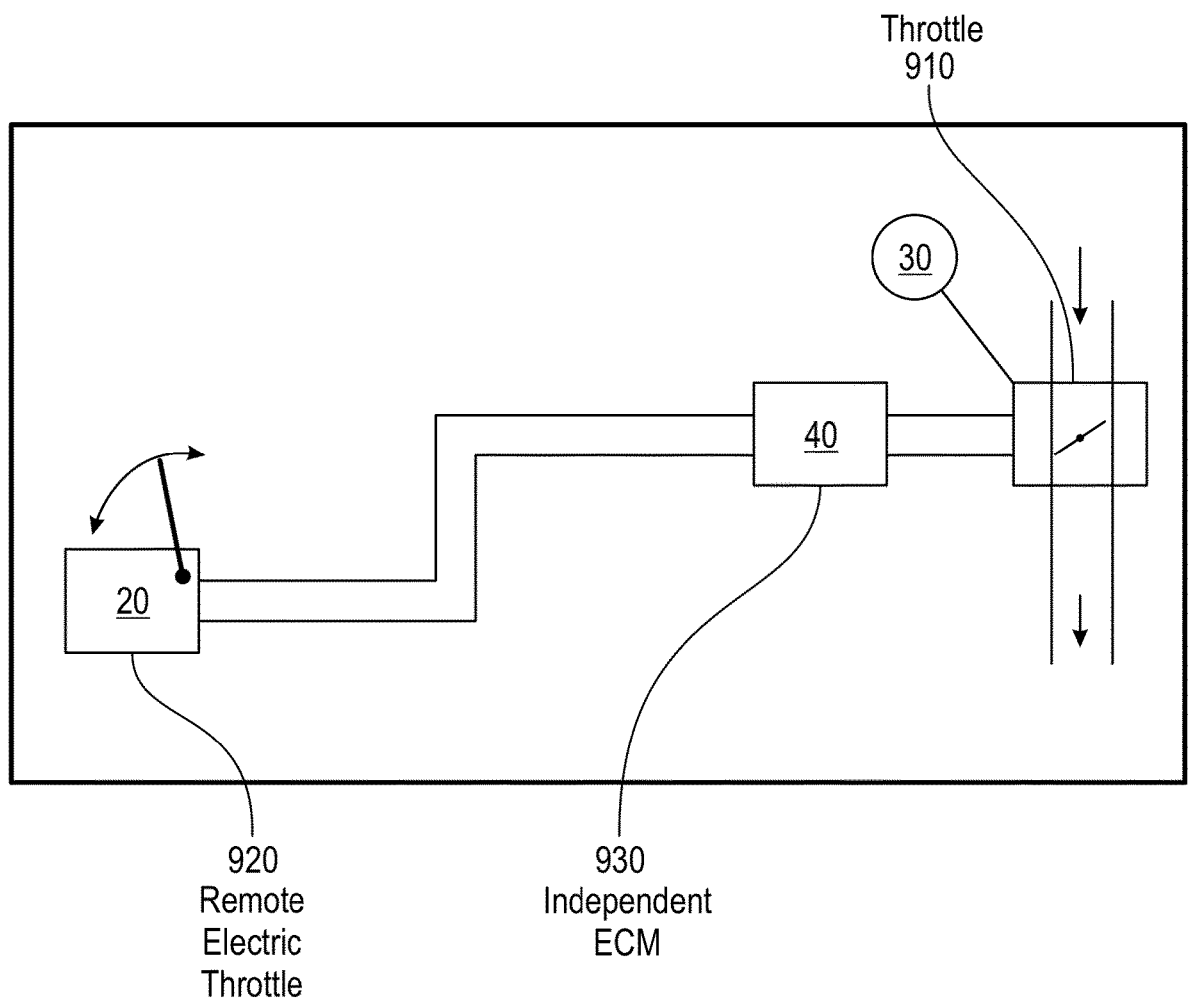
FIG. 9 shows an example embodiment.

In the example embodiment shown in FIG. 9, a remote electric throttle 920 is connected to an independent ECM 930, which ECM 930 is in turn connected to a throttle 910.

By controlling or adapting a remote electric throttle 920 so that, under parameters that would otherwise be certain to cause knock, the arrangement shown alters the throttle setting using an independent ECM 930 that is entirely remote from and not connected to the main ECU before passing the throttle control signals to the throttle 910. The ECM 930 alters the throttle position that the driver accelerator pedal is demanding, as received at the remote electric throttle 920, to one that in the conditions is anticipated will certainly not cause knocking (before knocking can occur) and sends the modified signal to the throttle 910.

The example embodiment can be used in newly manufactured engines or with remanufactured engines, and would not require changes to the original ECU for remanufactured engines (but would require additional components with newly manufactured engines).

Figure 10:
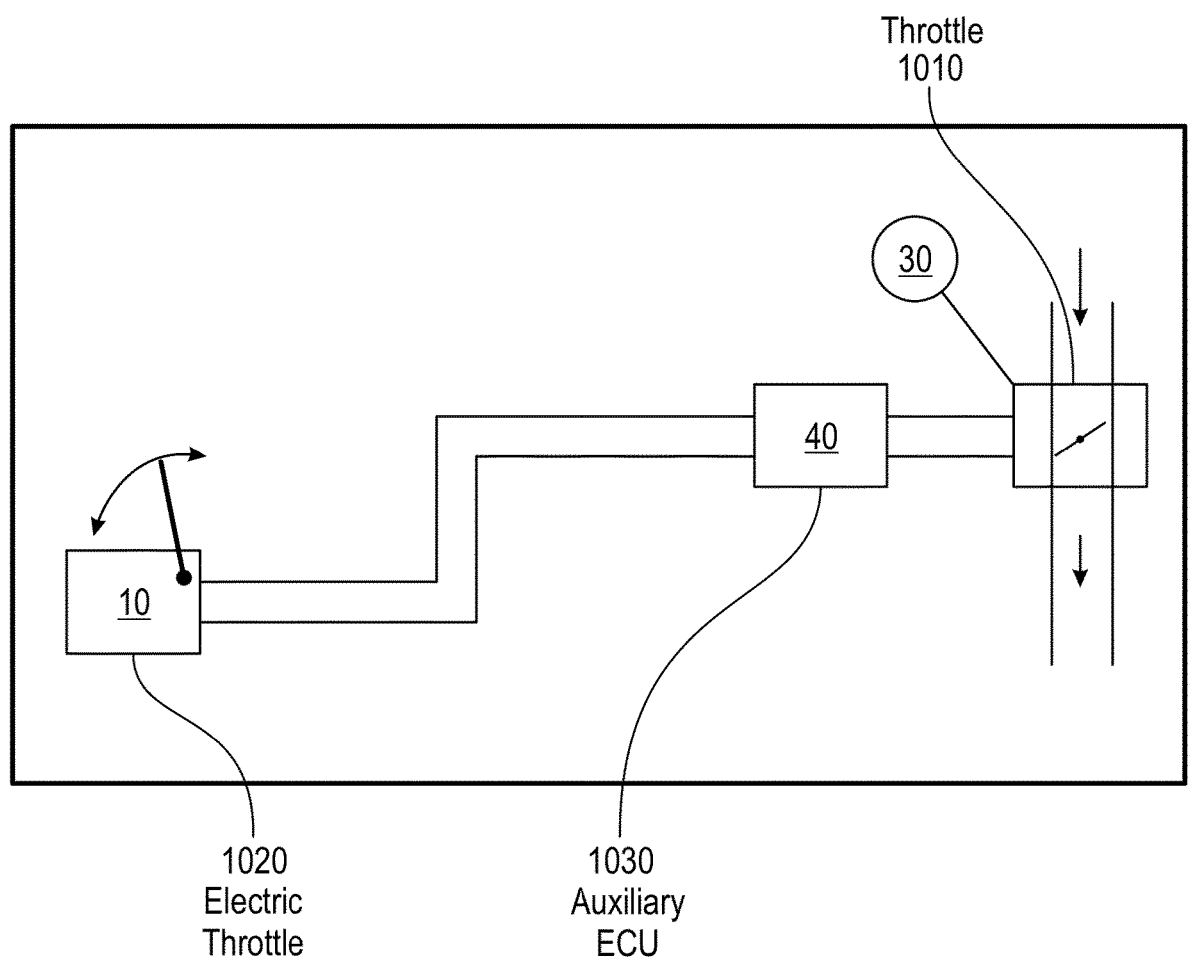
FIG. 10 shows an example embodiment.

In the example embodiment shown in FIG. 10, there is provided an electronic throttle 1020 connected to an auxiliary ECU 1030 which in turn is connected to a throttle 1010. By fitting an electronic accelerator signal device to a mechanical throttle 1020 then disconnecting the mechanical link to the original throttle and replacing it with an electronic one) and replacing the mechanical throttle with an electronic one 1020), under parameters that would otherwise be certain to cause knock, the electronic throttle arrangement can alter the throttle setting using an independent auxiliary ECU 1030 (or PCM or ECM) to modify the signal to the throttle 1010 that the driver accelerator pedal is demanding to one that in the conditions it is anticipated will certainly not cause knocking or pinking (before knocking or pinking occurs).

The example embodiment can be used in newly manufactured engines or with remanufactured engines, and would not require changes to the original ECU for remanufactured engines (but would require additional components with newly manufactured engines).

In embodiments, the unit used to compare the driver's current demand parameters with the "safe" or "unsafe" data map can obtain its parameters from historical prior engine and road testing data, but the current demand parameters (that might be safe or would lead to unsafe conditions if not corrected) can be obtained entirely from on-board or remote sources (or a combination of both).

In embodiments, current demand can be calculated from the on-board ECU, PCM or ECM. Additionally, in some embodiments more accurate current demand can be calculated by additionally using input from the in-car running conditions (usually collected live in the ECU). Input could include (but is not limited to) temperatures, lambda sensor readings, mass air flow measurements with hot wires, etc. Calculations of present performance (and BMEP) from the rate of acceleration (e.g. knowing the rate of change of engine revolutions and gear ratios etc from direct input or calculated from changes with time of road speed, engine revolutions, and even weight from suspension sensors). Such embodiments may require modifications to the original standard ECU.

In embodiments, rates of acceleration used to calculate the current and demanded performance (and BMEP) can also be determined remotely (for example from an onboard accelerometer). In such embodiments, fewer or no changes may be needed to the original standard ECU.

In embodiments, rates of acceleration can also be determined entirely remotely by a remote satellite signal(s) or other positioning device. In such embodiments, fewer or no changes may be needed to the original standard ECU.

In embodiments, all of the direct input used to calculate the current performance (and the imminent change(s) due to the driver's selected gear and/or accelerator pedal position used to predict the changes needed to avoid knocking/pinking) can be various combinations of data from a variety of sources that influence the accuracy. The more accurate the system, the higher the compression ratio can be set (because the measurement of the current and predicted conditions will be more reliable and able to operate safely nearer the recorded limits or "unsafe" conditions).

In some embodiments, two throttles are used and as such these embodiments are more likely to be applied to an existing vehicle with an engine that is rebuilt specifically to use and exploit a "very high" compression ratio. However, the use of two throttles can be used in a newly manufactured vehicle. Present vehicles typically contain a multitude of systems which control and link to an electronic throttle to adjust it for cruise or speed control, knocking, oil, coolant and ambient temperatures, traction control, stability control and anti-lock braking. Volume manufacture justifies the extensive work needed to combine all of the software functions and/or algorithms in a single ECU, where these can be combined in almost any combination of circumstances such that the unit costs of the ECU are reduced to minimal levels due to the volume of manufacture. For smaller-scale remanufacturing work, it is less cost-effective to modify an existing ECU to alter the control of the throttle for very high compression ratio remanufacture of an engine without running the risk of such modification interfering with other functions of the ECU or a safety feature, thus in embodiments it is more straightforward to leave the existing ECU in place and to fit an additional throttle or throttle controller in series that carries out the adjustments needed to protect a very high compression ratio engine from knocking or pinking. Further, in embodiments for engines with multiple mechanical throttles, the addition of a further electronic controller allows the existing controls to remain as standard while the electronic controller is operable to reduce the air flow into them all with one additional series electronic throttle between the air filter and the other throttles.

Figure 11:
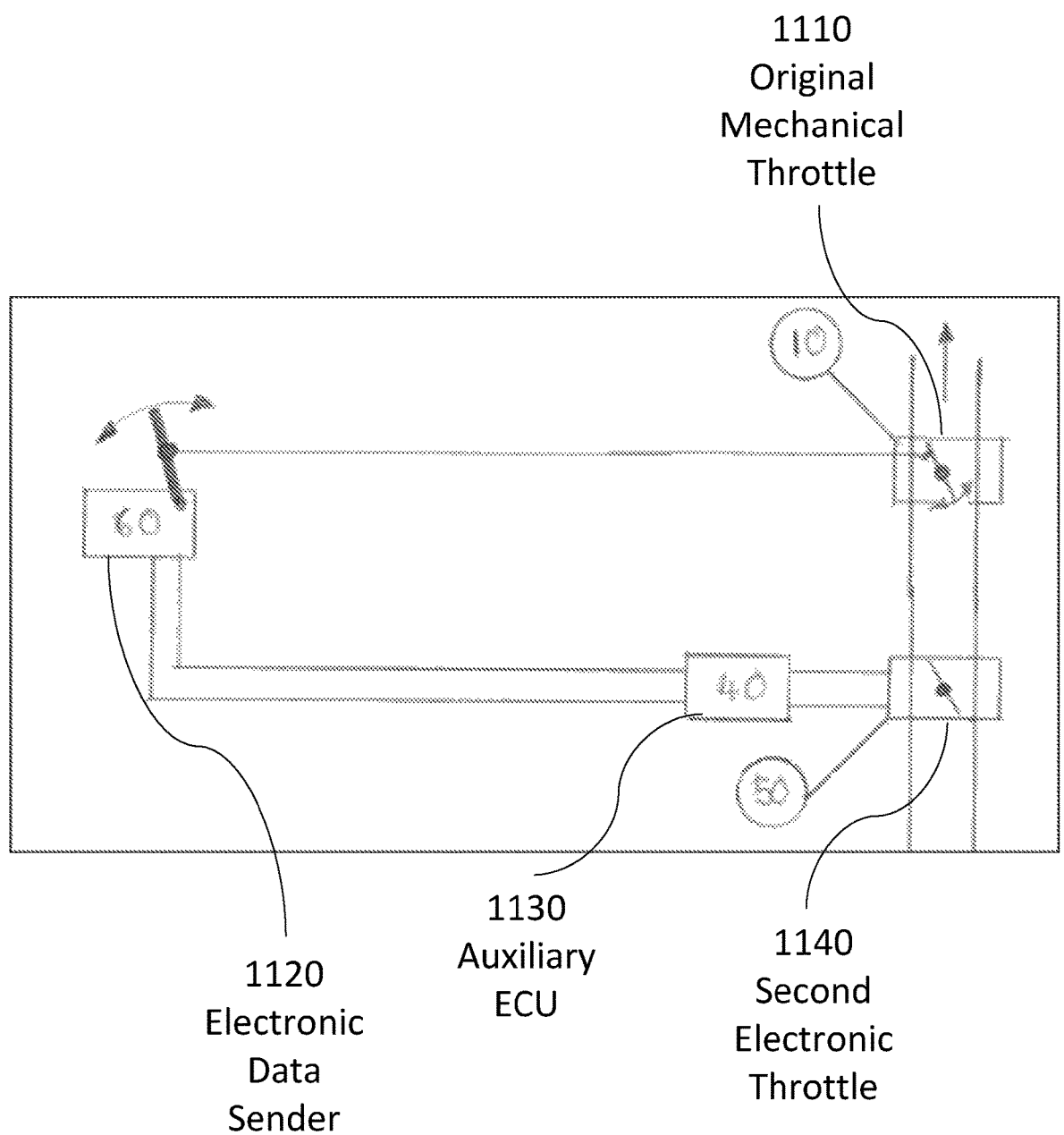
FIG. 11 shows an example embodiment.

In the example embodiment shown in FIG. 11, there is provided an electronic data sender 1120 connected to an original mechanical throttle 1110 and an auxiliary ECU 1130. The auxiliary ECU 1130 is connected to a second electronic throttle 1140 upstream of the original mechanical throttle 1110.

A mechanical throttle with dual function (i.e. a throttle that is both mechanically connected and electronically connected to a pedal), also fitted with an electronic data sender 1120 which both operates the original mechanical throttle 1110 and a second electronic throttle 1140 via an independent auxiliary ECU 1130 is provided so that the original mechanical throttle 1110 delivers the driver demand throttle setting but the auxiliary ECU 1130 controls the initial air flow (or in alternative embodiments, the following air flow if fitted after the mechanical throttle) so that the driver mechanical accelerator pedal demand is met but if the auxiliary ECU 1130 anticipates a throttle demand that will result in knock, the additional electronic throttle 1140 reduces the overall airflow to one that, in those conditions, it is anticipated will certainly not cause knocking/pinking before this can occur.

The example embodiment can be used in newly manufactured engines or with remanufactured engines, and would not require changes to the original ECU for remanufactured engines (but would require additional components with newly manufactured engines).

Figure 12:
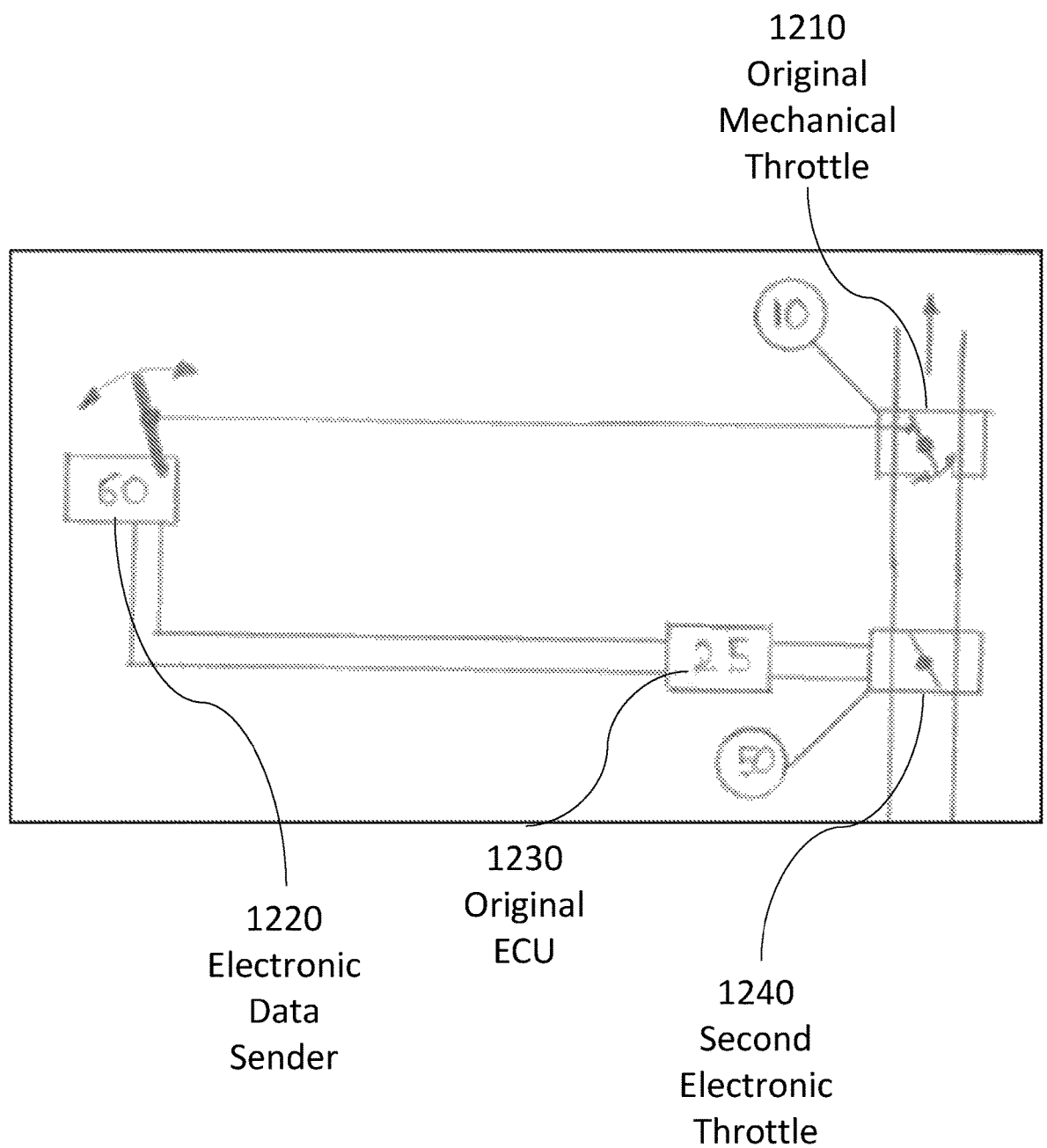
FIG. 12 shows an example embodiment.

In the example embodiment shown in FIG. 12, there is provided an electronic data sender 1220 connected to both an original mechanical throttle 1210 and an original ECU 1230, the original ECU being connected to a second electronic throttle 1240.

A mechanical throttle with dual function is fitted with an electronic data sender 1220 which both operates the original mechanical throttle 1210 and a second electronic throttle 1240 via the original ECU 1230 (which is reprogrammed to suit, so that the driver mechanical accelerator pedal demand is met but, if the reprogrammed ECU 1230 anticipates a throttle demand will result in knocking/pinking, the additional electronic throttle 1240 reduces the overall airflow to one that, in those conditions, is anticipated will certainly not cause knocking/pinking before this occurs.

Figure 13:
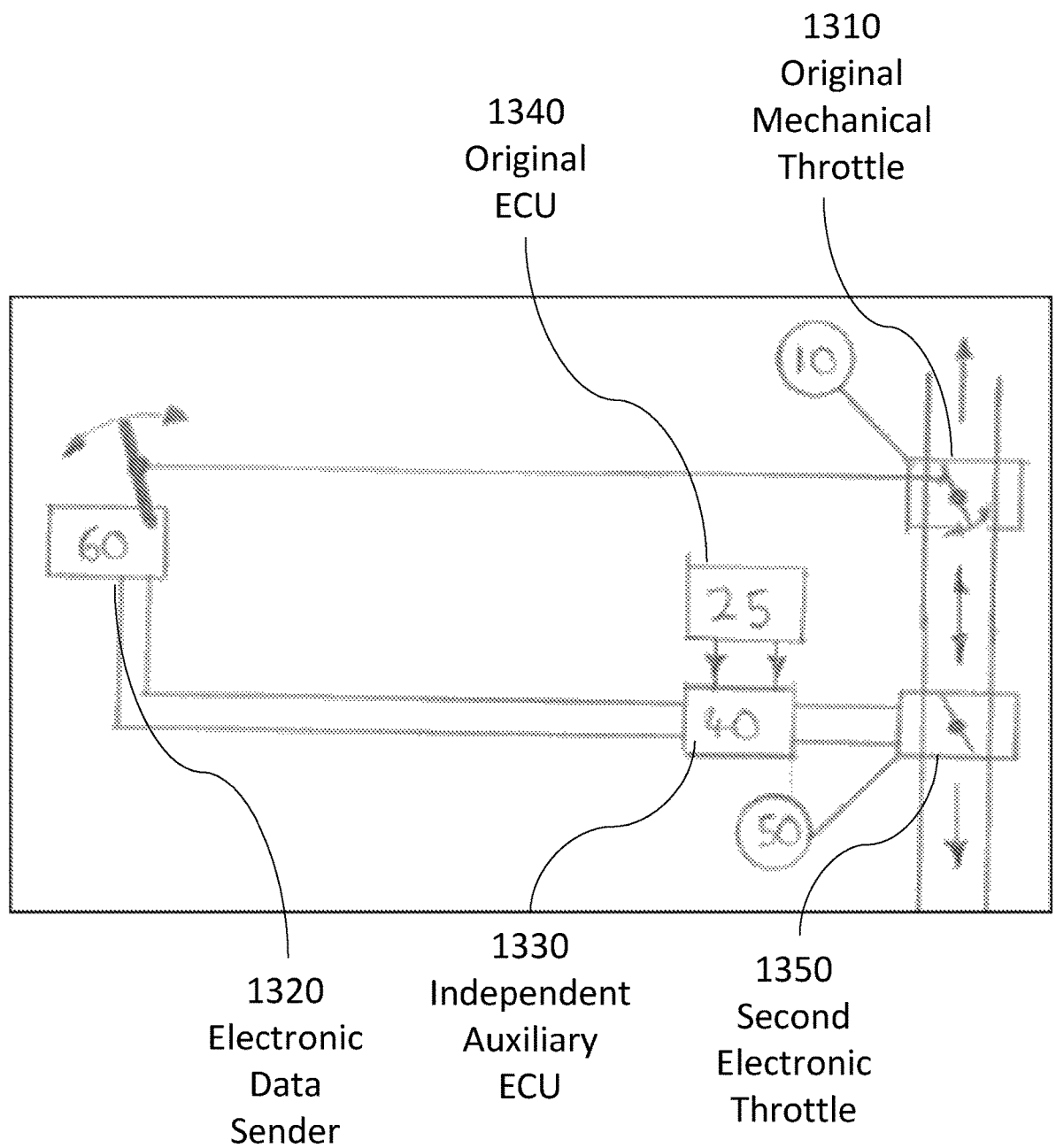
FIG. 13 shows an example embodiment.

In the example embodiment shown in FIG. 13, there is provided an electronic data sender 1320 connected to an original mechanical throttle 1310 and an independent auxiliary ECU 1330. The independent auxiliary ECU 1330 is connected to both an original ECU 1340 and to a second electronic throttle 1350.

A mechanical throttle with dual function, also fitted with a data sender 1320 which both operates the original mechanical throttle 1310 and a second electronic throttle 1350 via an independent auxiliary ECU 1330 is provided.

In this example embodiment, the independent auxiliary ECU 1330 communicates with the original ECU 1340 to obtain all of the performance data required to compare maps. In other embodiments, the independent auxiliary ECU 1330 communicates with the original ECU 1340 to obtain some of the performance data required to compare maps and some of the performance data by other external means such as accelerometers and/or GPS signals.

The original mechanical throttle 1310 delivers the driver demand throttle setting, but the auxiliary ECU 1330 controls the initial air flow (or the following air flow if fitted after the mechanical throttle 1310 in other embodiments) so that the driver mechanical accelerator pedal demand is met but, if the auxiliary ECU 1330 anticipates a throttle demand that will result in knock, the additional electronic throttle 1350 reduces the overall airflow to one that, in those conditions, it is anticipated will certainly not cause knocking (before knocking can occur).

In this example embodiment, the original components can remain as originally installed, with additional components installed should the engine be modified to have a very high compression ratio.

Figure 14:
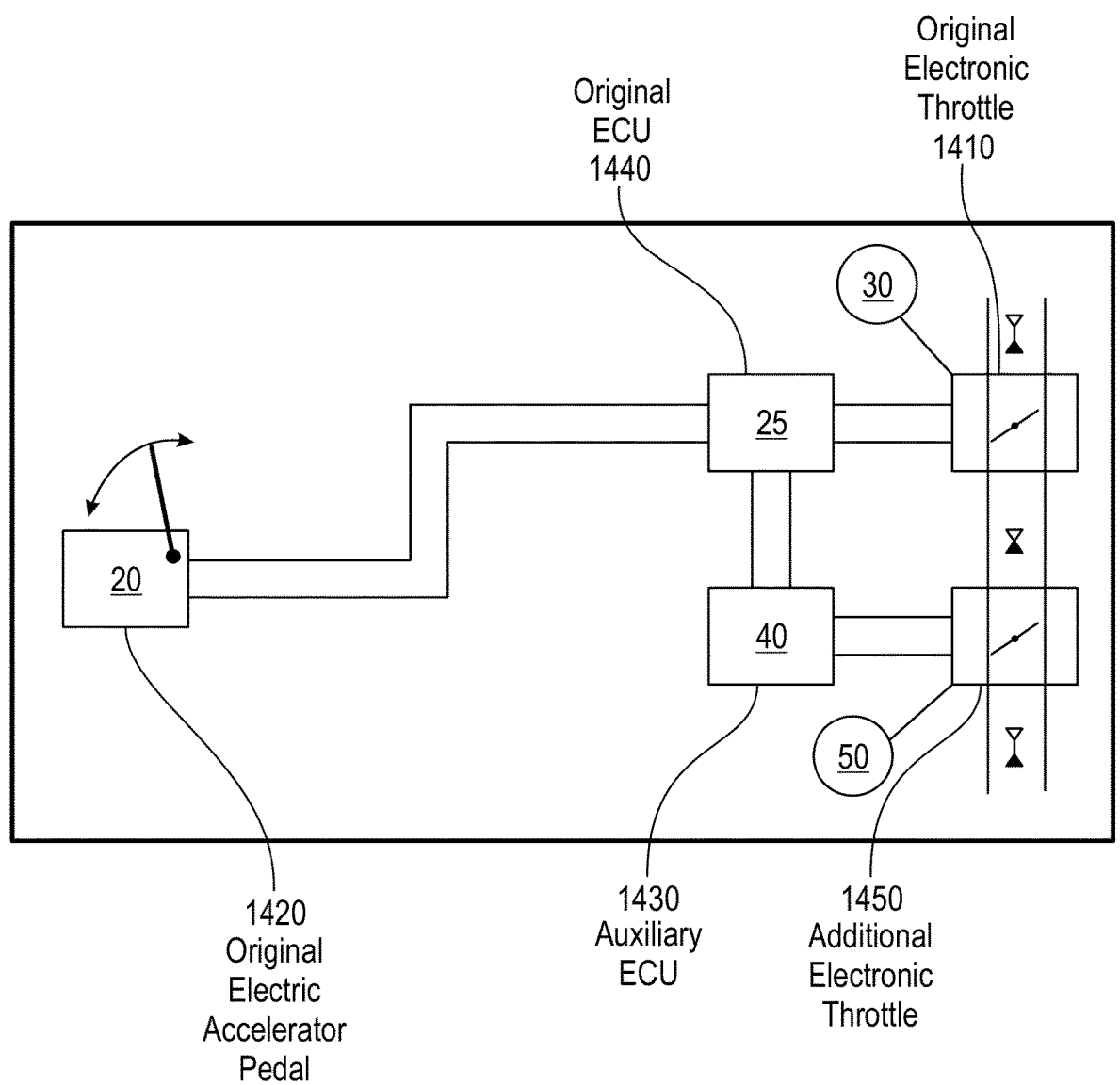
FIG. 14 shows an example embodiment.

In the example embodiment shown in FIG. 14, there is provided an original electronic accelerator pedal 1420 connected to an original ECU 1440. The original ECU 1440 is connected to both the original electronic throttle 1410 and an auxiliary ECU 1430. The auxiliary ECU 1430 is connected to an additional electronic throttle 1450.

The original electronic accelerator pedal 1420 connected to the original (or, in some embodiments, a replaced) electronic throttle 1410 via the original ECU 1440 to directly control the movement of the original electronic throttle 1410. In addition, data from the original electronic accelerator pedal 1420 is fed to an auxiliary ECU 1430 that controls an additional electronic throttle 1450 so that the driver demand from the original electronic accelerator pedal 1420 is met but, if the auxiliary ECU 1430 anticipates a throttle demand that will result in knock, the additional electronic throttle 1450 reduces the overall airflow to one that, in those conditions, it is anticipated will certainly not result in knocking (before knocking occurs).

In this example embodiment, the original components can remain as originally installed, with additional components installed should the engine be modified to have a very high compression ratio.

Figure 15:
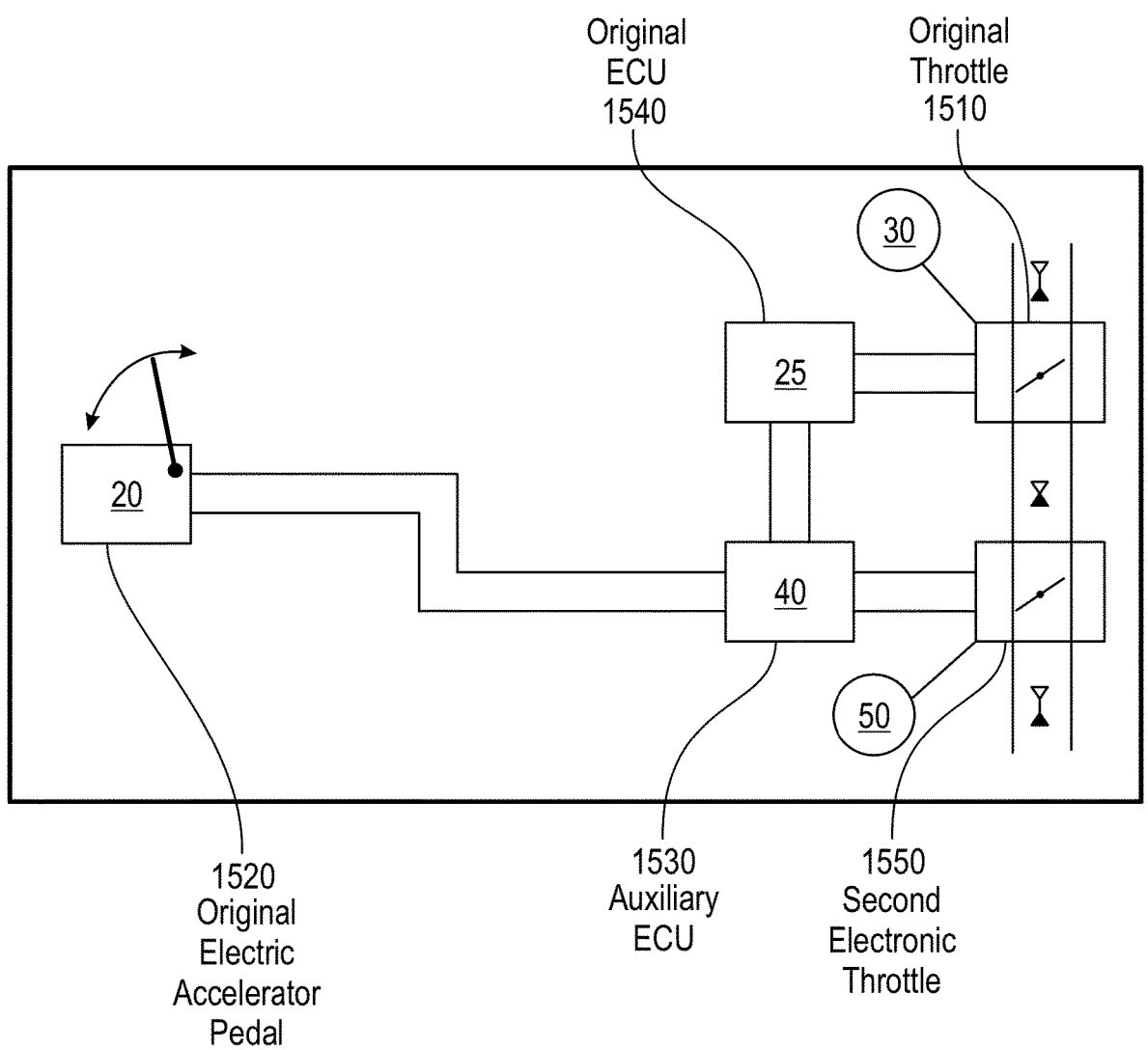
FIG. 15 shows an example embodiment.

In the example embodiment shown in FIG. 15, there is provided an original electronic accelerator pedal 1520 connected to an auxiliary ECU 1530. The auxiliary ECU 1530 is in turn connected to both an original ECU 1540 and a second electronic throttle 1550. The original ECU 1540 is connected to an original throttle 1510.

An original electronic accelerator pedal 1520 connects to the original (or replaced) electronic throttle 1510 via both an auxiliary ECU 1530 and then the original ECU 1540. This allows the ECUs 1530, 1540 to share data and directly control the movement of the original throttle 1510. The auxiliary ECU 1530 also controls an additional second electronic throttle 1550 so that the driver demand via the original electronic accelerator pedal 1520 is met but, if the auxiliary electronic throttle 1530 anticipates the throttle demand will result in knocking, the second electronic throttle 1550 is used to reduce the overall airflow such that the anticipated conditions will certainly not cause knocking (before knocking occurs).

In this example embodiment, the original components can remain as originally installed, with additional components installed should the engine be modified to have a very high compression ratio.

Figure 16:
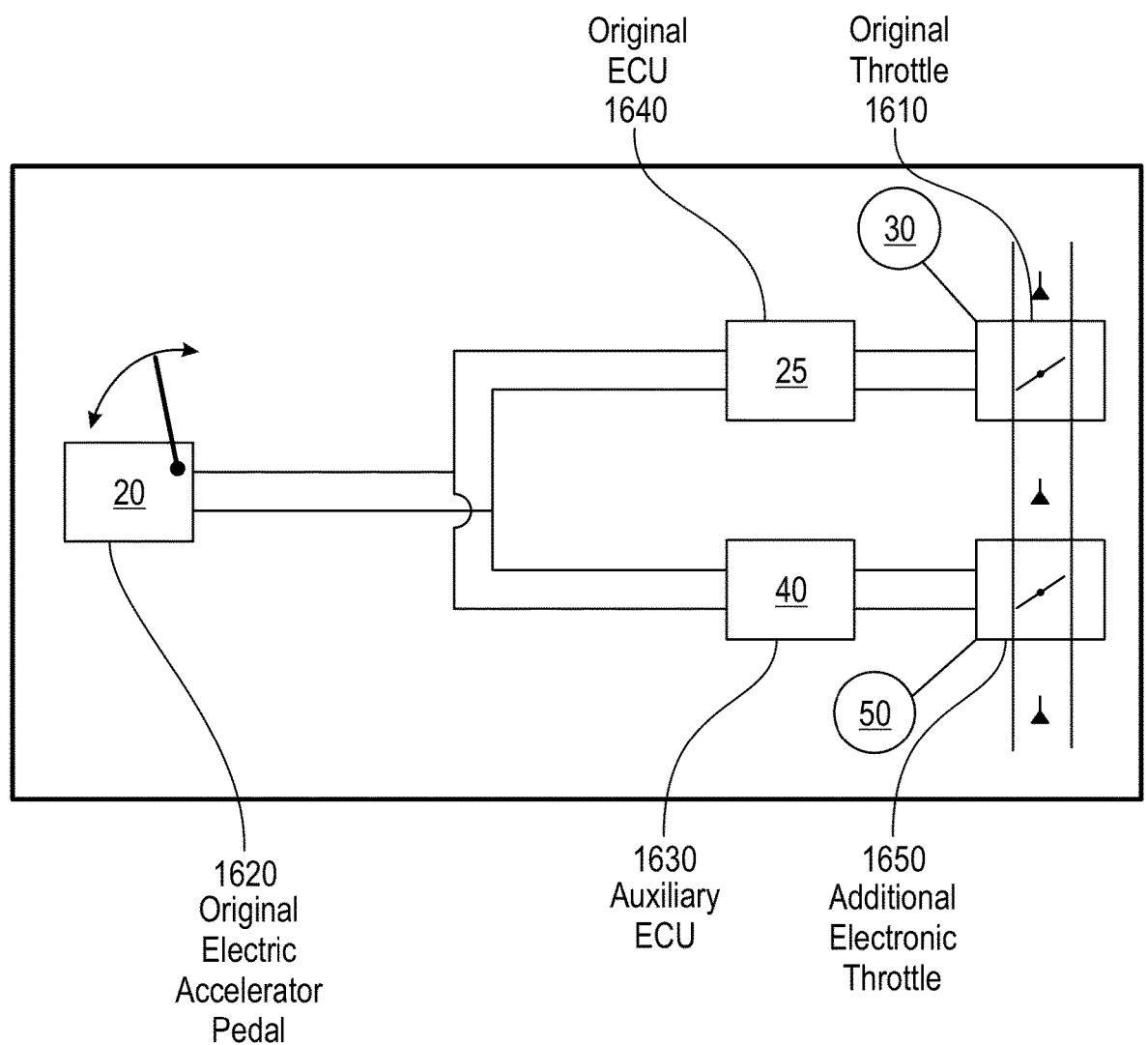
FIG. 16 shows an example embodiment.

In the example embodiment shown in FIG. 16, there is provided an original electronic accelerator pedal 1620 which is in communication with both to an original ECU 1640 and an auxiliary ECU 1630. The original ECU 1640 is in turn in communication with an original throttle 1610. The auxiliary ECU 1630 is in communication with an additional electronic throttle 1650.

The airflow of this embodiment flows from the additional electronic throttle 1650 to the original throttle 1610.

The original electronic accelerator pedal 1620 connects directly to the original ECU 1640 to control the movement of the original throttle 1610 but the auxiliary ECU 1630 receives the same pedal demand from the original electronic accelerator pedal 1620 as it is also connected directly to the original electronic accelerator pedal 1620. The auxiliary ECU 1630 controls an additional electronic throttle 1650 while the original ECU 1640 controls the original throttle 1610. Thus the driver demand via the original electronic accelerator pedal 1620 is met by the original ECU 1640 controlling the original throttle 1610 but, if the auxiliary ECU 1630 anticipates that the throttle demand will result in knocking, the additional electronic throttle 1650 reduces the overall airflow to a level that is anticipated will certainly not cause knocking (before knocking occurs).

If rebuilding an engine to have a higher geometric compression ratio, this example embodiment will not require changes to the original standard ECU.

Figure 17:
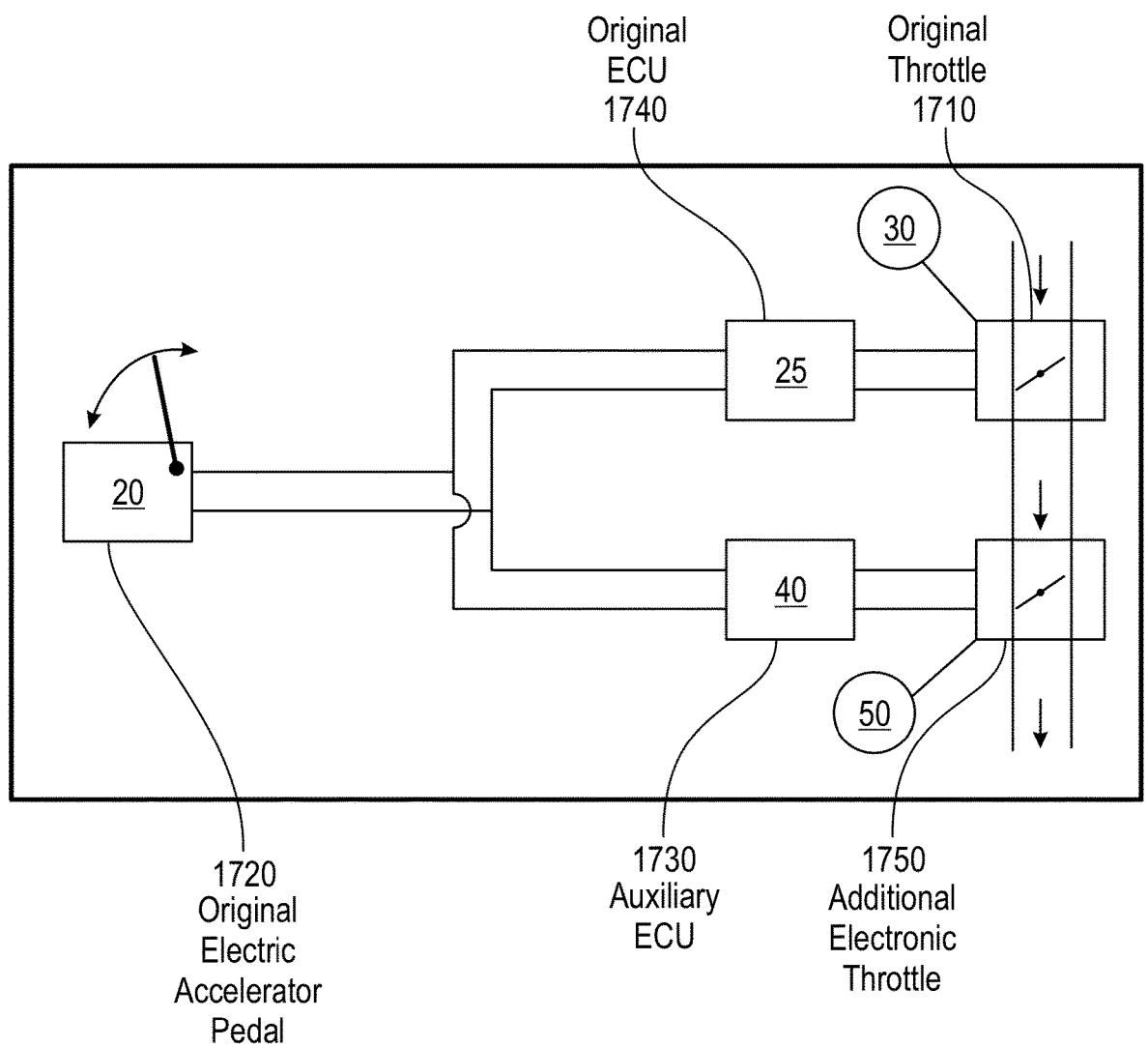
FIG. 17 shows an example embodiment.

In the example embodiment shown in FIG. 17, there is provided an original electronic accelerator pedal 1720 which is in communication with both to an original ECU 1740 and an auxiliary ECU 1730. The original ECU 1740 is in turn in communication with an original throttle 1710. The auxiliary ECU 1730 is in communication with an additional electronic throttle 1750. The airflow of the embodiment is the reverse of that in the embodiment shown in FIG. 16, such that the air flows towards the additional electronic throttle 1750 after passing through the original electronic throttle 1710, else the embodiments operate in the same way.

Figure 18:
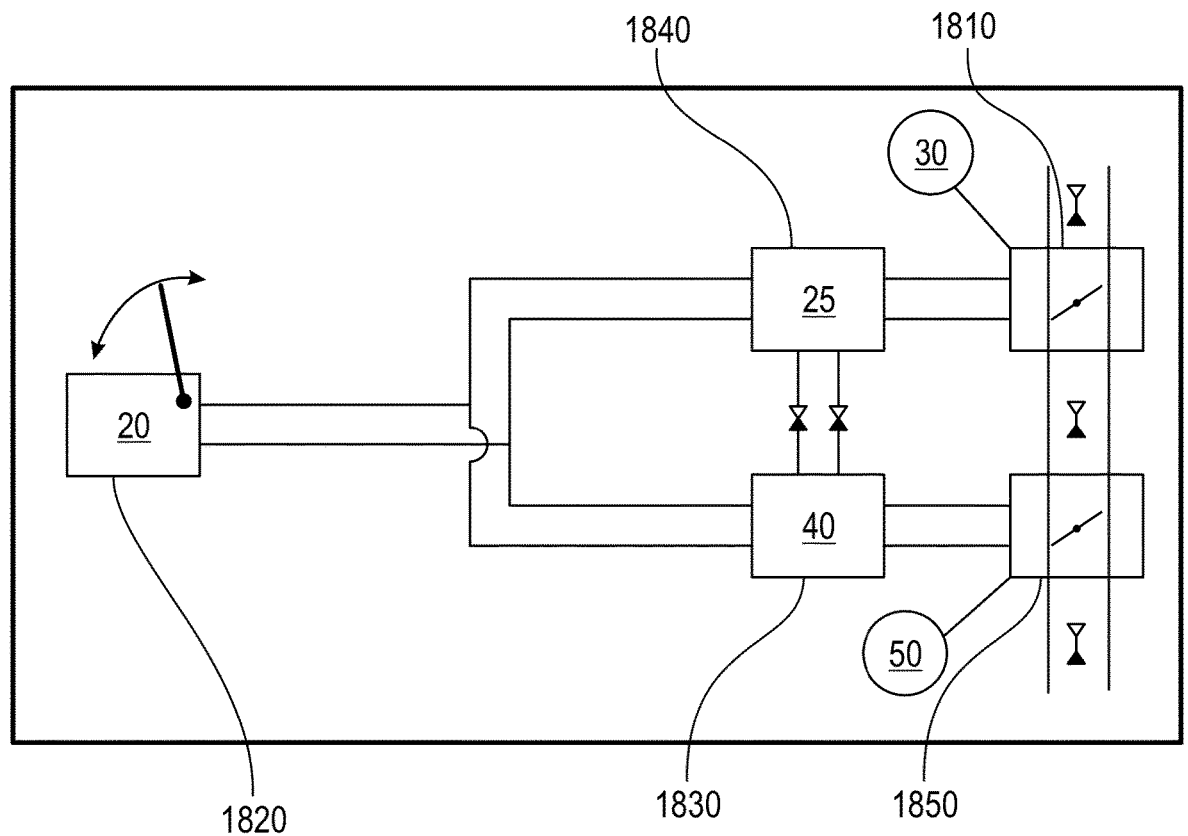
FIG. 18 shows an example embodiment.

In the example embodiment shown in FIG. 18, there is provided an original electronic accelerator pedal 1820 connected to both an original ECU 1840 and an auxiliary ECU 1830. The original ECU 1840 is connected to an original electronic throttle while the auxiliary ECU 1830 is connected to an additional electronic throttle 1850. The ECUs 1840, 1830 are also interconnected.

The original electronic accelerator pedal 1820 connects directly to both the original (or replaced) electronic throttle 1810 via the original ECU 1840 and the additional electronic throttle 1850 via the auxiliary ECU 1830. The driver demand as indicated by the original electronic accelerator pedal 1820 is met by the original ECU 1840 controlling the original electronic throttle 1810 but, if the auxiliary ECU 1830 anticipates that the throttle demand will cause knock, the additional electronic throttle 1850 is used to constrain the overall airflow to one that is anticipated will certainly not cause knocking (before knocking can occur). The pedal demand is received by both ECUs 1830, 1849 and they then communicate with each other to assess and decide which throttle will be opened by which amount for optimum performance, If rebuilding an engine to have a higher geometric compression ratio, this example embodiment may require changes to the original standard ECU.

The teaching of the above-described embodiments and aspects can be applied to both newly designed engines and vehicles as well as to remanufactured engines for which the original pistons are replaced with higher compression ratio pistons or the physical dimensions of the original engine can be modified so the original pistons now create a higher compression ratio by (for example) machining material from the top of the cylinder block or head or reducing the thickness of the cylinder head gasket or rebuilding the engine with longer connecting rods and/or a longer stroke crankshaft and/or engines built with mechanical throttle controls (that can be replaced by electronic pedal and throttle controls). The driver input in each option is modified accordingly to prevent pinking or knocking due to the high compression ratio. Specifically, the driver demand accelerator input, for example the position at which the driver has depressed the accelerator pedal or for example the throttle input signal provided from either an accelerator pedal or a cruise control system, can be altered by for example:

(1) Reprogramming (or providing additional programming within) an existing engine control unit (ECU) connected to the electronic pedal and throttle;

(2) Providing an auxiliary second ECU to share data with an existing original ECU, where either modified accelerator signals or modified throttle signals are passed back to the existing original ECU or the second ECU is connected directly to the electronic throttle; or (3) Programming an original ECU to modify accelerator signals or limit throttle opening to prevent knocking or pinking in the predetermined engine conditions that are stored as data maps (or in another instruction or data format). Manufacturers or modern cars can apply the teachings within one or more of a multitude of systems controlling and linked to an electronic throttle to adjust it for cruise or speed control, knocking, oil, coolant & ambient temperatures, traction control, stability control and anti-lock braking systems. Volume manufacture would allow the algorithms in the engine control unit to be modified to incorporate the teaching of limiting throttle opening using a predetermined dataset to prevent knocking or pinking for a given engine, especially one that has a high or very high compression ratio.

In other aspects and/or embodiments, a method of calculation to determine whether opening the throttle and/or a performance demand (from a driver for example, using the accelerator pedal) will cause knocking or pinking can be used instead of predetermined maps/map data/statistics. Use of a method of calculation allows use of the teaching of the aspects/embodiments without needing to pre-determine map data (or maps/statistics) for the engine. Instead, for example, an embodiment can use a determined relationship between BMEP and other factors, such as the selected gear, the pedal demand and the current revolutions per minute of the crankshaft, to determine whether the throttle position signal needs to be modified or not. Specifically, in some aspects/embodiments the determined relationship can be used in a formula or set of formulae to calculate or predict the cylinder pressures resulting from a performance demand in order to assess whether pinking or knocking would occur if the throttle is opened to meet a given performance demand.

In aspects and/or embodiments a physical stop can be used to restrict the maximum throttle opening position. The restriction provided by the physical stop can be to a predetermined maximum throttle opening position that has been predetermined. The predetermined maximum throttle opening position can be a position at which is has been determined would certainly not result in knocking or pinking occurring.

Optionally, in alternative aspects/embodiments, the physical stop can be selectable (and/or overridden) such that in can be enabled or disabled. For example, it could be driver-selectable via a control (e.g. via a user interface or using a physical dial, button or switch) or engaged or disengaged due to driver actions (e.g. depressing the accelerator pedal a certain amount, or depressing the accelerator pedal such that it presses a button located underneath the pedal when the pedal is depressed to its maximum extent). In some embodiments, multiple stop positions can be achieved using an adjustable stop (that can restrict the throttle opening to different positions depending on the setting of the adjustable stop); when used in conjunction with a driver control such as a physical switch on the dashboard of the vehicle it can allow multiple switch positions, for example "urban", "motorway", "sport", "unrestricted" which correspond to multiple respective stop positions that allow throttle opening to different positions and commensurate performance. This switch and adjustable stop arrangement in embodiments can allow different "economy settings" in vehicles, in which the restriction on the throttle opening is more extreme that needed simply to protect the engine from damage from knocking and reduces the performance of the engine/vehicle to allow a more powerful engine to perform with the characteristics of a less powerful engine but also with more fuel efficiency.

Optionally, in still further embodiments, the physical stop may be replicated electronically.

In embodiments, the stop can be an electronic motorised cam, for example. Such a physical stop may be adjustable to different positions. In some embodiments, adjustments can be made dynamically to adjust the physical stop position to allow the throttle to open to different maximum points.

In embodiments, a data logging system is used to record and determine the setting of the engine and/or vehicle and therefore is used to monitor these settings and the status of the engine/vehicle over time in order to predict the likely consequences of a new setting before it occurs (by comparing "safe" and "unsafe" prior data or maps).

In some embodiments, the rate of subsequent throttle opening following a throttle demand signal is controlled to permit the throttle to open only to the determined "safe" position (i.e. the safe position that is determined or predetermined not to cause damage to the internal combustion engine due to pinking, knocking or pre-ignition etc and/or over-compression of the fuel-air mixture within the internal combustion engine due to the throttle demand/signal). In some of these embodiments, the throttle signal is altered where it is determined that the throttle signal will cause the throttle to open to an extent that pinking, knocking or pre-ignition will result in the internal combustion engine. In some of these embodiments, the throttle signal is altered to reduce the extent that the throttle opens such that the throttle opens only to the extent that pinking, knocking or pre-ignition is prevented from occurring in the internal combustion engine. In others of these embodiments, the throttle signal is altered to replicate the driver depressing the accelerator pedal from a first position to a second position more gradually, i.e. to spread the throttle demand over a longer period of time and adjust the throttle signal to open the throttle over this longer period of time but within predetermined or determined "safe" throttle opening positions that prevent pinking, knocking or pre-ignition from occurring in the internal combustion engine. Thus in these other embodiments, to further control the avoidance of engine damage, the response rate of the throttle movement from a first position to a second position is variable/adjusted.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

What is claimed is:

1. A method of controlling a throttle for an internal combustion engine, the internal combustion engine operable to compress an ingested fuel air mixture, the method comprising the steps of:
   receiving a throttle signal to open the throttle to a first position;
   in response to receiving the throttle signal, making a determination, without the throttle signal being used to open the throttle to the first position, as to whether opening the throttle to the first position will cause damage to the internal combustion engine, the determination comprising assessing whether the throttle being opened to the first position will cause the ingested fuel air mixture to exceed a predetermined pressure threshold that will cause damage to the internal combustion engine; and
   in response to making the determination that opening the throttle to the first position will cause damage to the internal combustion engine, modifying the throttle signal to open the throttle to a second position, the second position of the throttle having been determined to open the throttle to a position that will not cause damage to the internal combustion engine.

2. The method of claim 1 wherein the step of making the determination as to whether opening the throttle to the first position will cause damage to the internal combustion engine comprises using predetermined map data.

3. The method of claim 1 wherein making the determination as to whether opening the throttle to the first position will cause damage to the internal combustion engine comprises using one or more calculations for the internal combustion engine, optionally wherein the one or more calculations are predetermined.

4. The method of claim 1 wherein the throttle signal is received from a throttle control.

5. The method of claim 4 wherein the throttle control is an accelerator pedal.

6. The method of claim 1 for use with an internal combustion engine arrangement further comprising a second throttle, wherein the throttle is operable to be opened to a first or second position to restrict the airflow to the second throttle.

7. The method of claim 6, wherein the throttle and the second throttle are configured in a series arrangement.

8. The method of claim 1 further comprising one or more sensors, wherein the one or more sensors provide data on the internal combustion engine and wherein the data is used to make the determination in the step of determining whether opening the throttle to the first position will cause damage to the internal combustion engine, the determination using map data for the internal combustion engine to assess whether the throttle being opened to the first position will cause the ingested fuel air mixture to exceed a predetermined pressure threshold that will cause damage to the internal combustion engine.

9. The method of claim 1 wherein modifying the throttle signal comprises generating a second throttle signal and controlling a further throttle using the second throttle signal.

10. A control system operable to modify a throttle signal for an internal combustion engine, the control system operable to modify the throttle signal by:
    receiving a throttle signal to open the throttle to a first position;
    in response to receiving the throttle signal, making a determination, without the throttle signal being used to open the throttle to the first position, as to whether opening the throttle to the first position will cause damage to the internal combustion engine, the determination comprising assessing whether the throttle being opened to the first position will cause the ingested fuel air mixture to exceed a predetermined pressure threshold that will cause damage to the internal combustion engine; and
    in response to making the determination that opening the throttle to the first position will cause damage to the internal combustion engine, modifying the throttle signal to open the throttle to a second position the second position of the throttle having been determined to open the throttle to a position that will not cause damage to the internal combustion engine.

11. The control system of claim 10 wherein the control system comprises an engine control unit.

12. The control system of claim 10, further comprising an internal combustion engine and a throttle, wherein the control system is operable to control the throttle and the throttle in communication with the internal combustion engine, and wherein the internal combustion engine is operable to compress an ingested fuel air mixture.

13. The control system of claim 12 wherein the internal combustion engine comprises a geometric compression ratio operable to cause damage to the internal combustion engine if the internal combustion engine is permitted to compress the ingested fuel air mixture above the predetermined pressure threshold.

14. The control system of claim 12 wherein the step of modifying the throttle signal is performed over a time period, optionally wherein the time period is determined by determining the time required for the modified throttle signal to cause performance of the internal combustion engine to reach the performance level indicated by the throttle signal.

15. A throttle assembly for use with an internal combustion engine, the throttle assembly comprising:
   a throttle and a stop, the stop operable to restrict a maximum opening position of the throttle to a predetermined opening position wherein the predetermined opening position is less than the maximum opening position; and
   a controller operable to:
      receive a throttle signal to open the throttle to a first position;
      in response to receiving the throttle signal, make a determination, without the throttle signal being used to open the throttle to the first position, as to whether opening the throttle to the first position will cause damage to the internal combustion engine, the determination comprising assessing whether the throttle being opened to the first position will cause the ingested fuel air mixture to exceed a predetermined pressure threshold that will cause damage to the internal combustion engine; and
      in response to making the determination that opening the throttle to the first position will cause damage to the internal combustion engine, modifying the throttle signal to open the throttle to the predetermined opening position.

16. The throttle assembly of claim 15, wherein the stop is switchable between at least two settings such that at one setting the maximum opening position of the throttle is restricted to the predetermined opening position and in another setting the maximum opening position of the throttle is unrestricted.

17. The throttle assembly of claim 16, wherein the stop is switchable based on any or any combination of: a switch; and an accelerator pedal position.

18. The throttle assembly of claim 15 wherein the stop is a physical stop.

19. The throttle assembly of claim 18 wherein the physical stop is any or any combination of: a moveable cam; a motorized cam.

20. The throttle assembly of claim 15 wherein the stop is an electronic stop.

* * * * *